US011625491B1

(12) United States Patent
Quevedo et al.

(10) Patent No.: US 11,625,491 B1
(45) Date of Patent: Apr. 11, 2023

(54) MANAGING NETWORK TRAFFIC WITH SENSITIVE DATA

(71) Applicant: F5 Networks, Inc., Seattle, WA (US)

(72) Inventors: Mark Ernest Quevedo, Issaquah, WA (US); Graham Rein Alderson, Seattle, WA (US)

(73) Assignee: F5, Inc., Seattle, WA (US)

( * ) Notice: Subject to any disclaimer, the term of this patent is extended or adjusted under 35 U.S.C. 154(b) by 104 days.

(21) Appl. No.: 16/993,977

(22) Filed: Aug. 14, 2020

Related U.S. Application Data

(60) Provisional application No. 62/887,224, filed on Aug. 15, 2019.

(51) Int. Cl.
*G06F 21/60* (2013.01)
*G06F 21/62* (2013.01)
*H04L 9/32* (2006.01)
*H04L 9/40* (2022.01)

(52) U.S. Cl.
CPC ........ *G06F 21/602* (2013.01); *G06F 21/6245* (2013.01); *H04L 9/321* (2013.01); *H04L 63/0428* (2013.01)

(58) Field of Classification Search
None
See application file for complete search history.

(56) References Cited

U.S. PATENT DOCUMENTS

| 10,129,298 B2* | 11/2018 | Grady | H04L 63/083 |
| 2012/0151224 A1* | 6/2012 | Koifman | G06F 21/602 |
| | | | 713/193 |
| 2018/0278550 A1* | 9/2018 | Rosen | H04L 47/34 |
| 2019/0007428 A1* | 1/2019 | Moen | H04L 67/02 |

OTHER PUBLICATIONS

Google, Under the Hood: How Password Checkup helps keep your accounts safe, available at: https://3.bp.blogspot.com/-lvjCRnXWibc/XFuP-PpY6yI/AAAAAAAAMIY/Ub7bi0AqFxQm7TH_e5EYVvCclywB7BWOwCLcBGAs/s1600/technical_infographic_new.png, accessed on Jun. 21, 2019, 1 page.

* cited by examiner

*Primary Examiner* — Brandon Hoffman
(74) *Attorney, Agent, or Firm* — Troutman Pepper Hamilton Sanders LLP (Rochester)

(57) ABSTRACT

Technology related to managing network traffic with sensitive data is disclosed. In one example, a method can include performing a cryptographic transformation of sensitive data of a request from a requestor for a resource. A portion of the cryptographic transformation of the sensitive data of the request can be transmitted to a sensitive data server. One or more possible matches to the cryptographic transformation of the sensitive data of the request can be received from the sensitive data server. A match to the cryptographic transformation can be identified within the one of the one or more possible matches. In response to identifying the match, an access policy for the requestor or the resource can be changed.

16 Claims, 8 Drawing Sheets

MANAGING NETWORK TRAFFIC WITH SENSITIVE DATA

CROSS REFERENCE TO RELATED APPLICATION

This application claims the benefit of U.S. Provisional Patent Application Ser. No. 62/887,224 filed Aug. 15, 2019, which is hereby incorporated by reference in its entirety.

FIELD

This technology generally relates to network traffic management, and more specifically to managing network traffic that contains sensitive data.

BACKGROUND

A software application can be distributed or partitioned across different computing devices. For example, a client-server architecture can partition tasks between a client device (such as a laptop or mobile device) and one or more server computers connected by an interconnection network (such as the Internet) and managed by a provider of computing service(s) and/or computing resource(s). The server computer(s) can execute software applications to provide virtual resources, software services, and/or content to the client devices. For example, client devices can initiate communication sessions with the server computers by sending requests over the interconnection network to the server computers, and the servers can respond to the requests. However, as the number of client devices seeking access to the server computers increases, intermediary computing devices, such as firewalls, can be added between the client devices and the server computers. A firewall can process requests from the client devices that are destined for the server computers. The firewall can add a layer of controls between the client devices and the server computers to potentially increase the scalability, availability, security, and/or performance of the client-server architecture. As an example, the added controls can analyze information within the network traffic and use the information to control whether requests from a given client are forwarded to the server computers or otherwise control access to protected network applications. However, as the complexity of applications increases and the number of interconnected devices increases, there can be many challenges in implementing a high performance, highly available, and secure client-server architecture including a firewall.

BRIEF SUMMARY

In one example, a method for managing network traffic with sensitive data is implemented in cooperation with a network traffic management system. The network traffic management system includes one or more network traffic management modules, sensitive data server modules, server modules or client modules. The method includes performing a cryptographic transformation of sensitive data of a request from a requestor for a resource. A portion of the cryptographic transformation of the sensitive data of the request is transmitted to a sensitive data server. One or more possible matches to the cryptographic transformation of the sensitive data of the request are received from the sensitive data server. The one or more possible matches have respective portions that match the transmitted portion of the cryptographic transformation of the sensitive data. An exact match to the cryptographic transformation can be identified from within the one or more possible matches. In response to identifying the exact match, an access policy for the requestor or the resource is changed.

In one example, a network traffic system includes one or more network traffic management modules, server modules, or sensitive data server modules, memory comprising programmed instructions stored thereon, and one or more processors configured to be capable of executing the stored programmed instructions to perform a method. The method includes performing a cryptographic transformation of sensitive data of a request from a requestor for a resource. A portion of the cryptographic transformation of the sensitive data of the request is transmitted to a sensitive data server. One or more possible matches to the cryptographic transformation of the sensitive data of the request are received from the sensitive data server. The one or more possible matches have respective portions that match the transmitted portion of the cryptographic transformation of the sensitive data. An exact match to the cryptographic transformation can be identified from within the one or more possible matches. In response to identifying the exact match, an access policy for the requestor or the resource is changed.

In one example, a non-transitory computer readable medium having stored thereon instructions for managing network traffic includes executable code that, when executed by one or more processors, causes the processors to perform a method. The method includes performing a cryptographic transformation of sensitive data of a request from a requestor for a resource. A portion of the cryptographic transformation of the sensitive data of the request is transmitted to a sensitive data server. One or more possible matches to the cryptographic transformation of the sensitive data of the request are received from the sensitive data server. The one or more possible matches have respective portions that match the transmitted portion of the cryptographic transformation of the sensitive data. An exact match to the cryptographic transformation can be identified from within the one or more possible matches. In response to identifying the exact match, an access policy for the requestor or the resource is changed.

In one example, a network traffic management apparatus, includes memory comprising programmed instructions stored thereon and one or more processors configured to be capable of executing the stored programmed instructions to perform a method. The method includes performing a cryptographic transformation of sensitive data of a request from a requestor for a resource. A portion of the cryptographic transformation of the sensitive data of the request is transmitted to a sensitive data server. One or more possible matches to the cryptographic transformation of the sensitive data of the request are received from the sensitive data server. The one or more possible matches have respective portions that match the transmitted portion of the cryptographic transformation of the sensitive data. An exact match to the cryptographic transformation can be identified from within the one or more possible matches. In response to identifying the exact match, an access policy for the requestor or the resource is changed.

DETAILED DESCRIPTION

Introduction

Figure 1:
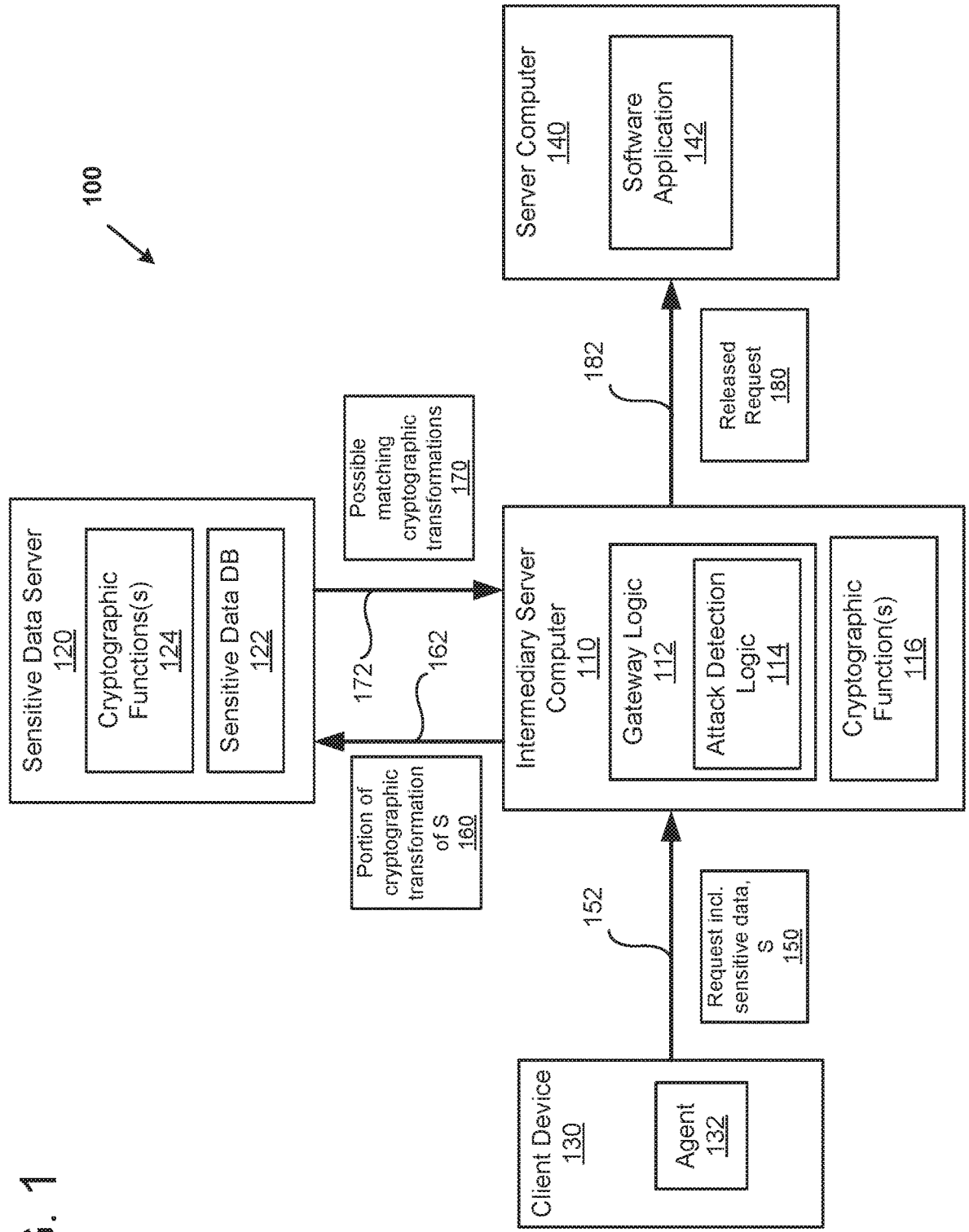
FIG. 1 is a block diagram of an example client-server architecture including an intermediary server computer and a sensitive data server.

Client-server architectures can include federated architectures. Federated architectures can include semi-autonomous information technology (IT) systems and applications that use agreed-upon standards to interoperate and to share data. Each of the different IT systems can perform specialized services that may be used by one or more of the IT systems. As one example, a federated architecture can include a sensitive data service that can maintain a database of sensitive data and can work in conjunction with other resources of the federated architecture to search for matches to the sensitive data while maintaining confidentiality of the sensitive data. For example, the sensitive data database can include credentials (e.g., username-password pairs) that have been compromised in a data breach or a data leak. As described herein, a service provider (e.g., a software application executing on a server computer or an intermediary server acting on behalf of the server computer) can send a request to the sensitive data service as part of a process to determine if a requestor of the service provider is using compromised credentials. Using a sensitive data service can enable multiple services and/or enterprises to provide updates to the information stored on the sensitive data service so that the quality of the information can be enhanced while maintaining confidentiality of the data. Additionally, offloading the storage of the sensitive data at the sensitive data service can enable other services to focus on core functionality while still maintaining security with the help of the sensitive data service.

As described herein, a service provider and a sensitive data service can partition a task of determining whether sensitive data (e.g., login credentials) is present in a database of the sensitive data service. Specifically, a service provider can receive a request from a client (e.g., the requestor) for a server resource. The request can include sensitive data (e.g., S), such as confidential login credentials. The service provider can perform a cryptographic transformation of the sensitive data of the request. For example, the service provider can generate a hash value of the sensitive data using a hashing algorithm (e.g., the hash value of the secret can be, HS=H(S)). A hashing algorithm (also referred to as a hash function) can be used to transform an input value (sometimes referred to as a key) to an output value (also referred to as a hash value or a hash) within a range of the hashing algorithm. For example, a hashing algorithm can be used to transform input values that fall within a smaller range (e.g., a 30 bit username-password pair) into hash values that fall within a larger range (e.g., 128 or 256 bits based on the particular hash function that is used). A portion of the cryptographic transformation of the sensitive data (e.g., four bits of the hash value of the sensitive data, such as PHS=HS [255:252]) can be transmitted to the sensitive data server. The sensitive data service can identify possible matches to the sensitive data of the request by comparing the received portion of cryptographic transformation to portions of cryptographic transformations of the stored sensitive data (e.g., the stored sensitive data can be, L={Sa, Sb, Sc, ... }). For example, each element of sensitive data stored by the sensitive data service can be hashed using the same hashing algorithm used by the service provider, and the hashed sensitive data can be stored and/or sorted based on the hash values of the stored sensitive data (e.g., a list of stored hashed sensitive data can be, HL={Ha, Hb, Hc, ... }, where Ha=H(Sa), Hb=H(Sb), Hc=H(Sc); and a list of stored partial hashed sensitive data can be, PHL={PHa=Ha[255:252], PHb=Hb[255:252], PHc=Hc[255:252], ... }). Possible matches to the sensitive data of the request include the respective elements of the stored sensitive data having portions of hash values that match the portion of the hash value received at the sensitive data service (e.g., S is a possible match to Sa when PHS=PHa, and so forth). These matches are also the possible matches of the cryptographic transformation of the sensitive data of the request to the cryptographic transformations of the respective elements of the stored sensitive data (e.g., HS is a possible match to Ha when PHS=PHa, and so forth). The possible matches to the cryptographic transformation (e.g., the hash values) of the sensitive data of the request can be returned to the service provider. The service provider can determine whether at least one of the possible matches are an exact match to the cryptographic transformation of the sensitive data of the request. If the cryptographic transformations match, there is a relatively high likelihood that the sensitive data of the request and the stored sensitive data match.

By partitioning the search for the sensitive data in this manner, the sensitive data stored in the sensitive data service can be kept confidential within the sensitive data service and the sensitive data of the request at the service provider can be kept confidential within the service provider. While a portion of the hashed sensitive data of the request and hashes of matching data within the sensitive data service are exchanged (and could potentially be observed by an adversary), it can be computationally expensive and/or infeasible to recover the sensitive data from this exchange. Strong hashing algorithms have a one-way property, where it is computationally infeasible to determine the input value of the hashing algorithm given the hash value generated by the hashing algorithm. In the case of the sensitive data of the request, only a portion of the hash value is exchanged with the sensitive data service, making it even more difficult to recover the sensitive data from an intercepted transmission of the portion of the exchanged hash value. Additionally, hash values can be relatively efficient to compute compared to other forms of encryption, and so exchanging hashed values (or portions of hashed values) can be useful where relatively fast computations are appropriate (such as when the computations are being performed transparently to a user and where extra delay could reduce a usability or a user experience of a service).

The service provider seeking to determine whether the sensitive data is present in a database of the sensitive data service can be a primary service (e.g., a software application executing on a server computer) or an intermediary service (e.g., a software application executing on an intermediary server) that may be transparent to the client. Intermediary servers can include firewalls, proxy servers, application delivery controllers, network traffic management systems, and/or other components interposed between the client and the server of a client-server architecture.

A firewall is a network security system that implements a security policy that specifies how network traffic passing through the firewall is to be monitored and/or controlled. Firewalls can analyze fields within network packets from different layers of a network stack and make access control decisions based on the fields from the network packets. For example, a traditional firewall can analyze packet fields from network and transport layers (layers 3 and 4 of the Open Systems Interconnection (OSI) model) and a web application firewall (WAF) can analyze packet fields from the application layer (layer 7 of the OSI model) and make access control decisions based on the analyzed fields. As one example, a firewall can control (e.g., allow or block) traffic based on attack signatures. An attack signature includes rules and/or patterns that potentially identify attacks against a web or other software application. The firewall can analyze network traffic and search for patterns that match known and/or modelled attack signatures. If a matching pattern is detected, the firewall can implement a security policy. For example, a security policy can alarm a system administrator, redirect all network traffic or network traffic that is identified as potentially being part of an attack, restrict resources that are available to some or all of the network traffic, block network traffic that matches a field, parameter, or filetype (e.g., traffic that is identified as potentially being part of an attack), and so forth.

One type of cyberattack is a credential-stuffing attack. A credential-stuffing cyberattack can include performing automated requests to access a protected network-accessible resource (e.g., a web application or webpage) using compromised account credentials, such as the credentials that are released during a data breach. Account credentials can include username-password pairs or email-password pairs, for example. The credential stuffing cyberattack can succeed when unauthorized access to the protected network resource is achieved. The credential stuffing cyberattack may be effective because many users reuse the same username and password across multiple applications. Accordingly, a signature of a credential-stuffing attack can include the repeated use of potentially compromised credentials within a threshold time interval. As described herein, a firewall can use the sensitive data service to determine whether the requests processed by the firewall include potentially compromised credentials, and the firewall can adjust an access policy for the requestor or the requested resource based on the results received from the sensitive data service. For example, when a threshold number of credentials are matched from the sensitive data service, a credential-stuffing attack can be identified, and the access policy can be changed to match the security policy during the credential-stuffing attack. As a specific example, future requests using potentially compromised credentials can be blocked.

Example Architectures for Managing Network Traffic with Sensitive Data

FIG. 1 is a block diagram of an example client-server architecture 100, including an intermediary server computer 110, that can be used to perform a computing task that is distributed among different components of the client-server architecture 100. The client-server architecture 100 can include an intermediary server computer 110, a sensitive data server 120, a client device 130, and a server computer 140. The client-server architecture 100 can be implemented using a client-server architecture as described in more detail with reference to FIG. 7, where the different components (110, 120, 130, 140) of the client-server architecture can be implemented using a computing environment as described in more detail with reference to FIG. 8.

As one example, the client device 130 can request access to services and/or resources provided by the server computer 140, and the intermediary server computer 110 can control access to the server computer 140. Specifically, the client device 130 can execute an agent 132 (e.g., a browser or other software application) that requests a service of a software application 142 executing on the server computer 140. The server computer 140 can be secured by the intermediary server computer 110. Specifically, the intermediary server computer 110 can control access to the server computer 140 using gateway logic 112.

The gateway logic 112 can control the flow of network traffic between the client device 130 and the server computer 140. For example, the gateway logic 112 can provide routing paths for network packets to and from the server computer 140 and can allow or block network packets based on various security and/or routing policies. The gateway logic 112 can include various modules, such as attack detection logic 114, proxies, firewalls, and/or other modules for applying the policies to control the network traffic. Specifically, the gateway logic 112 (e.g., the firewall and/or proxy) can add a layer of controls between the client devices and the server computers to potentially increase the security and/or performance of the client-server architecture 100. For example, the gateway logic 112 can intercept all client traffic destined for the server computer 140 and only allow the traffic to be forwarded after the traffic complies with all security policies.

A proxy is an agent (e.g., a server computer and/or software) that is situated in a path of communication between a client and a server that can intercept communications (e.g., network packets, frames, datagrams, and messages) between the client and the server. The proxy can perform various services, such as load balancing, rate monitoring, caching, encryption/decryption, address translation, and access control, for example. The proxy can function as a virtual server that presents a network address of the proxy as the network address for the server application. For example, a client can request a service of the server by sending a request that is destined for the server application (e.g., using the network address of the virtual server as the destination address). The proxy can intercept the request on behalf of the server application. In some examples, the proxy can determine whether the client is authenticated to access the server application prior to forwarding the request to the server. Before forwarding, the proxy can modify the request from the client by changing the destination address to be the network address of the server computer. The server computer can respond to the request from the client via the proxy. Specifically, the proxy can intercept the response from the server and modify the response by changing the source address of the response to be the network address of the virtual server. The response can then be forwarded to the client. In this manner, the proxy can be relatively transparent to the client and the server (e.g., a user of the client can be unaware that the proxy is present).

The gateway logic 112 can identify network packets (e.g., requests) with sensitive data and can utilize the services of the sensitive data server 120 to determine whether the sensitive data is present in a sensitive data service database 122. Specifically, the gateway logic 112 can analyze fields within the network packets to determine a source address, a destination address, a source port, a destination port, a network packet type, an application or application protocol, and/or the sensitive data. The sensitive data can include full or partial account credentials (e.g., a username, a password, an email address, a username-password pair, or an email-address-password pair) or other information that is of a confidential nature (e.g., a credit card number, a date of birth, or a social security number). The requests can be destined for the server computer 140 or the intermediary server computer 110 (such as when a user presents credentials to the intermediary server computer 110 prior to accessing the server computer 140). The requests can use different application-layer protocols, such as Hypertext Transfer Protocol (HTTP), Hypertext Transfer Protocol Secure (HTTPS), File Transfer Protocol (FTP), or secure shell (SSH). The requests can be for different applications, such as for software application 142 or a different application executing on the server computer 140 or the intermediary server computer 110.

The gateway logic 112 can cryptographically transform the sensitive data using the cryptographic function(s) 116. The cryptographic function(s) 116 can be implemented in hardware, software, and/or a combination of hardware and software. As one example, the cryptographic function(s) 116 can be a cryptographic hash function. A cryptographic hash function is a hash function having the one-way property. Examples of cryptographic hash functions include Secure Hash Algorithm One (SHA-1), SHA-2, Message-Digest Algorithm Four (MD4), and MD5. As another example, the cryptographic function(s) 116 can include a series of transformations, such as a first function followed by a second function. As a specific example, the sensitive data can be added or other otherwise combined with a secret value that is shared by the gateway logic 112 and sensitive data server 120, and the output can be hashed using a cryptographic hash function. The client-server architecture 100 can potentially be more performant when the cryptographic function(s) 116 are more efficient to compute as compared to more complex algorithms. By increasing the gateway logic 112 (and the sensitive data service 120) performance, the operation of the intermediary server computer 110 can appear more transparent to a user of the client device 130.

The intermediary server computer 110 (e.g., the gateway logic 112) can transmit all or a portion of the cryptographic transformation of the sensitive data to the sensitive data server 120, and possible matches to the sensitive data can be determined. The sensitive data database 122 can include encrypted and/or unencrypted sensitive data. For example, the data in the sensitive data database 122 may have been identified as compromised during a data breach or a data leak. The data of the sensitive data database 122 can be cryptographically transformed using cryptographic function(s) 124 prior to or after storing in the sensitive data database 122. Faster performance may be achieved when the cryptographic function(s) 124 are the same as the cryptographic function(s) 116, and when the cryptographically transformed data is stored in the sensitive data database 122. The portion of the cryptographic transformation of the sensitive data transmitted from the intermediary server computer 110 can be compared to the respective portions of cryptographic transformations of the sensitive data of the sensitive data database 122. If matches are found, one or more elements of the sensitive data of the sensitive data database 122 may match the sensitive data received at the intermediary server computer 110. The cryptographic transformations of the sensitive data of the sensitive data database 122 having portions that match the portion transmitted from the intermediary server computer 110 can be transmitted to the intermediary server computer 110. Alternatively, the matching portion of the respective cryptographic transformations of the sensitive data of the sensitive data database 122 can be omitted to potentially reduce a bandwidth of the response and/or to increase security.

Transmitting only a portion of the cryptographic transformation can provide additional security to the sensitive data because only a portion of the cryptographic transformation is exposed outside of the intermediary server computer 110. When more bits are transmitted, more information related to the sensitive data is exposed and the sensitive data is potentially less secure. On the other hand, when more bits are transmitted, the sensitive data server 120 can potentially return a reduced number of possible matches to the sensitive data, which can potentially increase performance since an amount of communications between the intermediary server computer 110 and the sensitive data server 120 can be reduced. The number of bits (e.g., a size of the portion) that are transmitted from the intermediary server 110 can be dynamically varied based on loading (e.g., an amount of network traffic transiting the intermediary server computer 110) or based on security parameters. For example, when the intermediary server computer 110 is highly loaded, a larger portion of the cryptographic transformation of the sensitive data can be transmitted to the sensitive data server 120 so that a more effective search can be performed by the sensitive data server 120 and fewer possible matches will be returned. As another example, when the intermediary server computer 110 is more lightly loaded, a smaller portion of the cryptographic transformation of the sensitive data can be transmitted to the sensitive data server 120 so that less information about the sensitive data is transmitted, but more possible matches will be returned.

The gateway logic 112 can determine whether at least one of the possible matches are an actual match to the cryptographic transformation of the sensitive data of the request. Specifically, the gateway logic 112 can compare the full cryptographic transformations returned as possible matches to the full cryptographic transformation of the sensitive data in the request. If the full cryptographic transformations match, there is a relatively high likelihood that the sensitive data of the request matches data that is stored in the sensitive data database 122.

When a match is detected, the intermediary server computer 110 (e.g., the gateway logic 112) can change an access policy for the requestor, the intermediary server computer 110, and/or the server computer 140. For example, the gateway logic 112 (e.g., the firewall or proxy) can include the attack detection logic 114 to identify potential cyberattacks and to control the network traffic accordingly. The attack detection logic 114 can include models of attack signatures and can monitor network traffic to determine whether patterns of the network traffic match any of the models of attack signatures. As one example, an attack signature can model a credential stuffing attack where compromised credentials are repeatedly used to attempt to gain access to the server computer 140. The attack detection logic 114 can track the number of matches from different requests within a predefined or dynamic time interval, and when the number of matches exceeds a threshold, the attack detection logic 114 can determine that a credential stuffing attack is potentially underway. In response to detecting a potential credential stuffing attack, the access policy for the requestor, the intermediary server computer 110, and/or the server computer 140 can be changed. For example, the gateway logic 112 can implement a security policy, which can alarm a system administrator, redirect all network traffic or network traffic that is identified as potentially being part of an attack, restrict resources that are available to some or all of the network traffic, block network traffic that matches a field, parameter, or filetype (e.g., traffic that is identified as potentially being part of an attack), and so forth.

In sum, the intermediary server computer 110 and the sensitive data server 120 can be used to manage network traffic containing sensitive data. As a specific example, an agent 132 of the client device 130 can generate a request 150 containing sensitive data (e.g., "user1:pass1"). The request can be destined for a software application 142 executing on the server computer 140. The client device 130 can transmit the request 150 over the communication channel 152, and the intermediary server computer 110 can intercept the request 150. The intermediary server computer 110 can detect that the request includes sensitive data and can perform a cryptographic function, such as a cryptographic hash, using the sensitive data as an input to generate a cryptographic transformation (e.g., "abcd1234beef"). The request 150 can be buffered in the intermediary server computer 110 while the request 150 is being processed. A portion 160 (e.g., "abc") of the cryptographic transformation can be transmitted over the communication channel 162 to the sensitive data server 120. The sensitive data server 120 can store cryptographic transformations (e.g., {deadbeef7890, abcd12345678, abcd1234beef, . . . }) in the sensitive data database 122. The sensitive data server 120 can compare the portion 160 to portions (e.g., {dea, abc, abc, . . . }) of the stored cryptographic transformations to determine possible matches (e.g., {abc, abc}). The possible matching cryptographic transformations 170 (e.g., {abcd12345678, abcd1234beef}) can be transmitted over the communication channel 172 to the intermediary server computer 110. The intermediary server computer 110 can compare the received possible matching cryptographic transformations 170 to the cryptographic transformation of the sensitive data of the request. In this example, one of the possible matches (abcd1234beef) matches the cryptographic transformation of the sensitive data of the request, indicating that the sensitive data ("user1:pass1") was known to the sensitive data server 120. In response to detecting the match, an access policy for the requestor or the intermediary server computer 110 can be changed. For example, the request 150 and other requests from that requestor can be dropped. As another example, the request 150 can be forwarded to the server computer 140 as the released request 180, but access privileges may be reduced for the requestor. For example, the reduced access privileges can be communicated to the server computer 140 by modifying data in the request 150 or adding additional information to the released request 180. Alternatively, the reduced access privileges can be communicated separately from the intermediary server computer 110 to the server computer 140. As another example, a count of matching cryptographic transformations can be updated, and if the count is greater than a threshold, future requests having matching cryptographic transformations can be blocked at the intermediary server computer 110.

It should be appreciated by one of ordinary skill in the art having the benefit of the present disclosure, that the communications channels 152, 162, 172, and 182 have been simplified for the ease of illustration. The communications channels 152, 162, 172, and 182 can be implemented using multiple networks and/or networking devices to interconnect the components of the client-server architecture 100.

Figure 2:
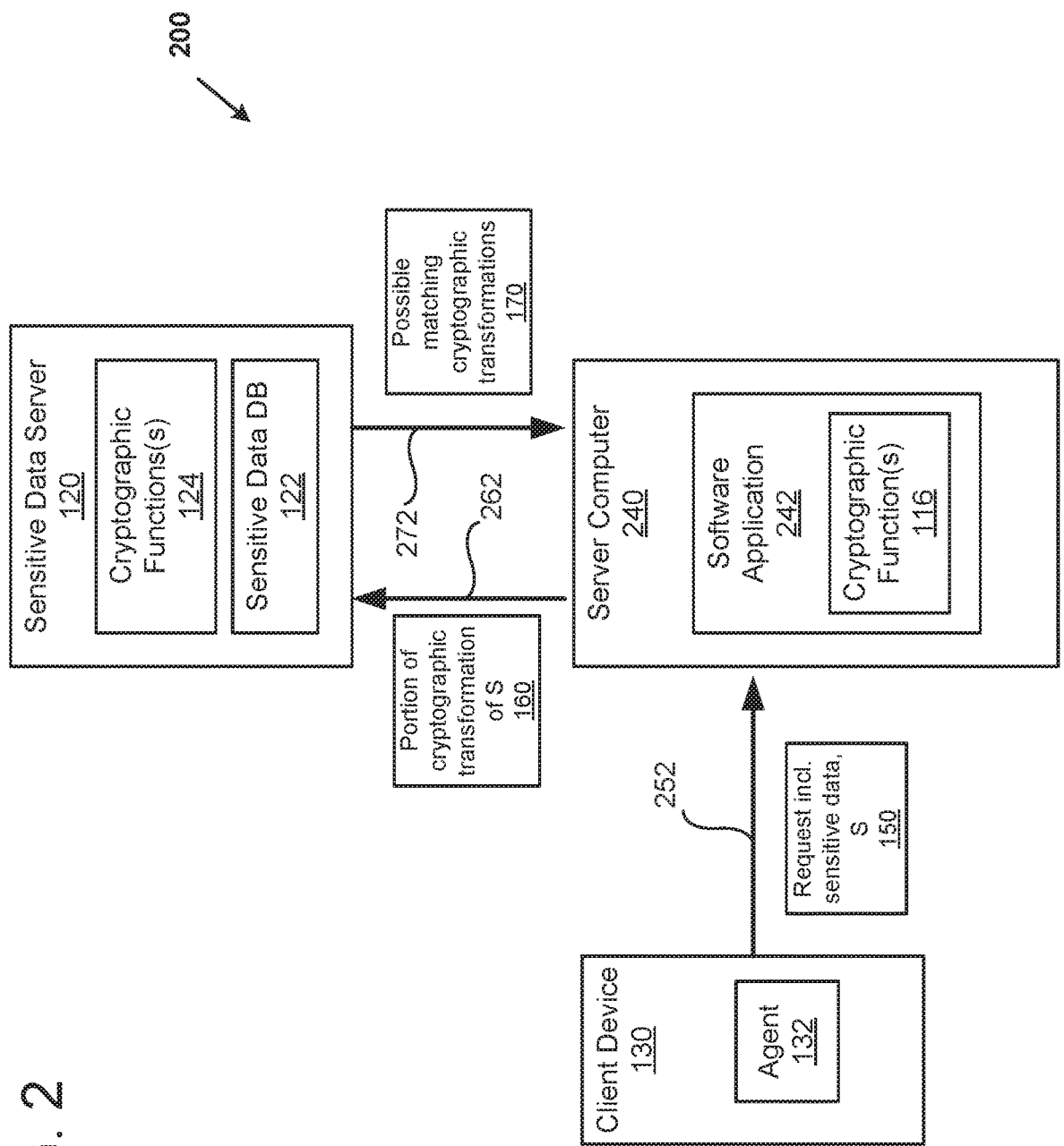
FIG. 2 is a block diagram of an example client-server architecture including a sensitive server computer.
Figure 3:
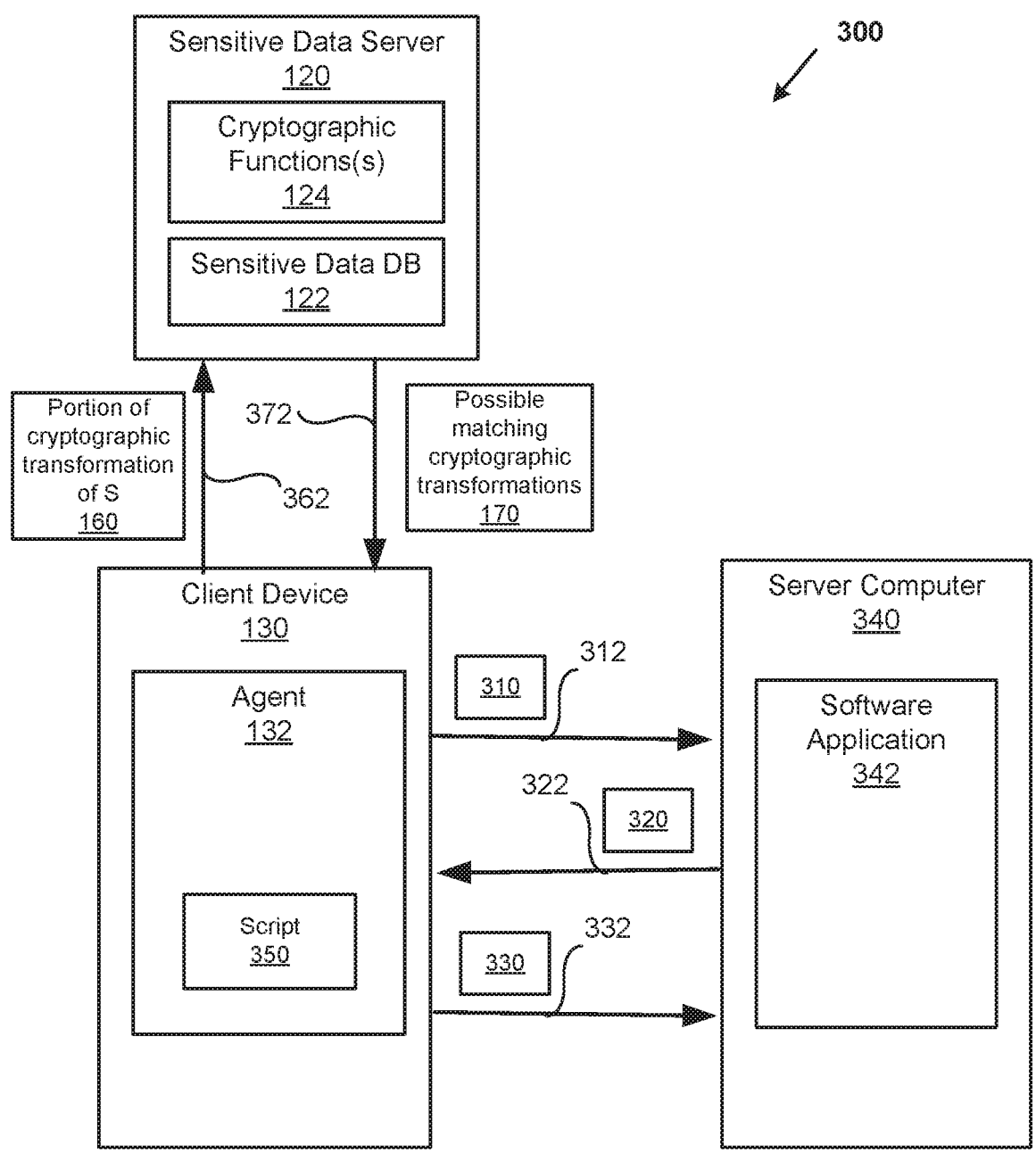
FIG. 3 is a block diagram of an example client-server architecture including a sensitive server computer.

FIGS. 2 and 3 illustrate that the sensitive data server can be used by different components of a client-server architecture. For example, FIG. 2 shows that a server computer can be in communication with the sensitive data server and FIG. 3 shows that a client device can be in communication with the sensitive data server.

FIG. 2 is a block diagram of an example client-server architecture 200, including a sensitive data server 120, that can be used to perform a computing task that is distributed among different components of the client-server architecture 200. In this example, the server computer 240 can perform at least some of the tasks that were performed by the intermediary server computer 110 of FIG. 1. The client-server architecture 200 can include the sensitive data server 120, the client device 130, and the server computer 240. The client-server architecture 200 can be implemented using a client-server architecture as described in more detail with reference to FIG. 7, where the different components (120, 130, 240) of the client-server architecture can be implemented using a computing environment as described in more detail with reference to FIG. 8.

As one example, the client device 130 can request access to services and/or resources provided by the server computer 240. Specifically, the client device 130 can execute an agent 132 (e.g., a browser or other software application) that requests a service of a software application 242 executing on the server computer 240. The request 150 from the client device 130 can be transmitted over the communication channel 252 to the server computer 240. The request 150 can include sensitive data. The sensitive data can include account credentials, a credit card number, a social security number, or other information that has value by remaining generally confidential.

The software application 242 can control access to its service by selectively responding to the request 150. The software application 242 can detect that the request includes sensitive data and can use the sensitive data as an input to the cryptographic function(s) 116 to generate a cryptographic transformation. A portion 160 of the cryptographic transformation can be transmitted over the communication channel 262 to the sensitive data server 120. The sensitive data server 120 can store cryptographic transformations in the sensitive data database 122. The sensitive data server 120 can compare the portion 160 to portions of the stored cryptographic transformations to determine possible matches. The possible matching cryptographic transformations 170 can be transmitted over the communication channel 272 to the server computer 240. The software application 242 can compare the received possible matching cryptographic transformations 170 to the cryptographic transformation of the sensitive data of the request. The software application 242 can respond differently based on whether any of the possible matching cryptographic transformations 170 match the cryptographic transformation of the sensitive data of the request. For example, the request 150 can be denied when there is a match and allowed when there is no match. As another example, the request 150 can be allowed when there is a match and denied when there is no match. As another example, an access privilege for the requestor can be determined based on whether there is a match. As another example, a count of matching cryptographic transformations can be updated, and if the count is greater than a threshold, future requests having matching cryptographic transformations can be denied by the software application 242.

It should be appreciated by one of ordinary skill in the art having the benefit of the present disclosure, that the communications channels 252, 262, and 272 have been simplified for the ease of illustration. The communications channels 252, 262, and 272 can be implemented using multiple networks and/or networking devices to interconnect the components of the client-server architecture 200.

FIG. 3 is a block diagram of an example client-server architecture 300, including a sensitive data server 120, that can be used to perform a computing task that is distributed among different components of the client-server architecture 300. The client-server architecture 300 can include the sensitive data server 120, the client device 130, and the server computer 340. The client-server architecture 300 can be implemented using a client-server architecture as described in more detail with reference to FIG. 7, where the different components (120, 130, 340) of the client-server architecture can be implemented using a computing environment as described in more detail with reference to FIG. 8.

As illustrated in FIG. 3, the server computer 340 and/or the client device 130 can perform at least some of the tasks that were performed by the intermediary server computer 110 of FIG. 1. In general, the client device 130 and the server computer 340 can partition cryptographic and access control functions in different ways, but the communication with the sensitive data server 120 is performed by the client device 130. As described below, in a first embodiment, cryptographic transformations can be performed by the server computer 340, and in a second embodiment, cryptographic transformations can be performed by the client device 130.

The client device 130 can request access to services and/or resources provided by the server computer 340. Specifically, the client device 130 can execute an agent 132 (e.g., a browser or other software application) that requests a service of a software application 342 executing on the server computer 340. The agent 132 is capable of executing a client-side script 350 (e.g., a JavaScript script) that is sent from the server computer 340. The request 310 from the client device 130 can be transmitted over the communication channel 312 to the server computer 340.

In the first embodiment, the request 310 can include sensitive data. The sensitive data can include account credentials, a credit card number, a social security number, or other information that has value by remaining generally confidential. The software application 342 can detect that the request includes sensitive data and can generate a cryptographic transformation of the sensitive data. The software application 342 can respond to the request 310 by sending a response 320 over the communication channel 322. The response 320 can include a portion of the cryptographic transformation of the sensitive data and the script 350. The script 350 can include code that causes the agent 132 to communicate with the sensitive data server 120. Specifically, the script 350 can cause the portion 160 of the cryptographic transformation of the sensitive data to be transmitted over the communication channel 362 to the sensitive data server 120. The sensitive data server 120 can store cryptographic transformations in the sensitive data database 122. The sensitive data server 120 can compare the portion 160 to portions of the stored cryptographic transformations to determine possible matches. The possible matching cryptographic transformations 170 can be transmitted over the communication channel 372 to the client device 130. The script 350 can compare the received possible matching cryptographic transformations 170 to the cryptographic transformation of the sensitive data of the request. The script 350 can respond differently based on whether any of the possible matching cryptographic transformations 170 match the cryptographic transformation of the sensitive data of the request. For example, an additional request 330 can be transmitted over the communication channel 332 to the server computer 340. The additional request 330 can include an indication of whether any of the possible matching cryptographic transformations 170 matched the cryptographic transformation of the sensitive data of the request 310. As another example, the script 350 can modify options, links, or other parameters that are presented in the agent 132 based on whether there is a match.

In the second embodiment, the request 310 can request a page of the software application 342. The software application 342 can respond to the request 310 by sending a response 320 over the communication channel 322. The response 320 can include the page and the script 350. Sensitive data can be entered using the agent 132 (such as by entering data into a user interface of the page). The script 350 can generate a cryptographic transformation of the sensitive data, and a portion of the cryptographic transformation of the sensitive data. The script 350 can include code that causes the agent 132 to communicate with the sensitive data server 120. Specifically, the script 350 can cause the portion 160 of the cryptographic transformation of the sensitive data to be transmitted over the communication channel 362 to the sensitive data server 120. The sensitive data server 120 can store cryptographic transformations in the sensitive data database 122. The sensitive data server 120 can compare the portion 160 to portions of the stored cryptographic transformations to determine possible matches. The possible matching cryptographic transformations 170 can be transmitted over the communication channel 372 to the client device 130. The script 350 can compare the received possible matching cryptographic transformations 170 to the cryptographic transformation of the sensitive data of the request. The script 350 can respond differently based on whether any of the possible matching cryptographic transformations 170 match the cryptographic transformation of the sensitive data of the request. For example, an additional request 330 can be transmitted over the communication channel 332 to the server computer 340. The additional request 330 can include an indication of whether any of the possible matching cryptographic transformations 170 matched the cryptographic transformation of the sensitive data of the request 310. As another example, the script 350 can modify options, links, or other parameters that are presented in the agent 132 based on whether there is a match.

Tradeoffs of confidentiality, security, and performance can be made by varying where the cryptographic and access control functions reside. For example, confidentiality and/or security may be decreased and performance of the server computer 340 (or of an intermediary server computer) may be increased when more of the cryptographic and access control functions are performed by the client device 130. Conversely, confidentiality and/or security may be increased and performance of the server computer 340 (or of an intermediary server computer) may be decreased when less of the cryptographic and access control functions are performed by the client device 130. It should be appreciated by one of ordinary skill in the art having the benefit of the present disclosure, that the cryptographic and access control functions can be allocated among the client device 130, the sensitive data server 120, the server computer 340, and an intermediary server in various different ways to achieve an appropriate tradeoff between confidentiality, security, and performance. Additionally, the communications channels 312, 322, 332, 362, and 372 have been simplified for the ease of illustration. The communications channels 312, 322, 332, 362, and 372 can be implemented using multiple networks and/or networking devices to interconnect the components of the client-server architecture 300.

Figure 4A:
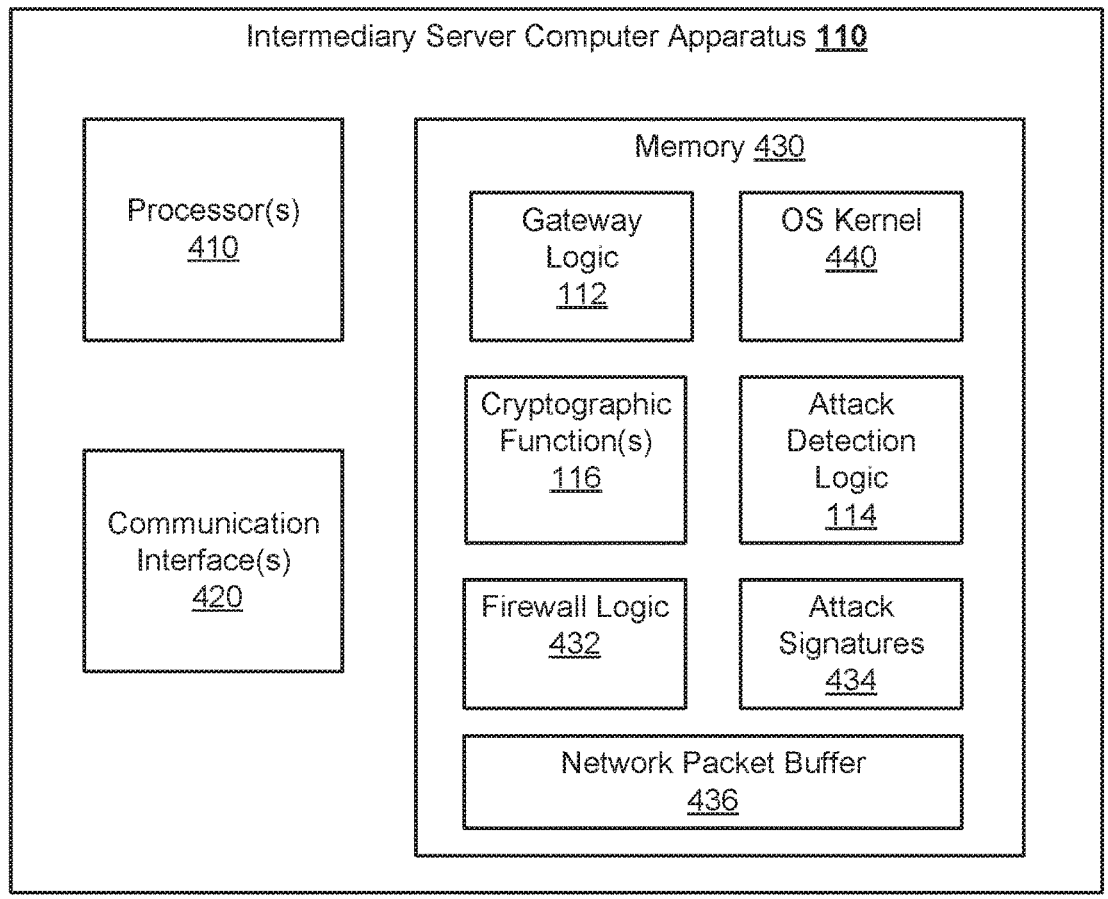
FIG. 4A is a block diagram of an example intermediary server computer apparatus.

FIG. 4A is a block diagram of an example intermediary server computer apparatus 110. For example, the intermediary server computer apparatus 110 can be a firewall appliance, a proxy server computer, an application delivery controller, a network traffic management system, or another component configured to be in a communication path between a client and a server of a client-server architecture. The intermediary server computer apparatus 110 can be implemented using a computing environment as described in more detail with reference to FIG. 8.

The intermediary server computer apparatus 110 can include one or more processor(s) 410, one or more communication interface(s) 420, and memory 430. The processor 410, communication interface 420, and the memory 430 can be coupled together with an interconnect (not shown) so that the components of the computer apparatus 110 can communicate with each other using the interconnect. The communication interface 420 can be used to send and receive communications (e.g., network packets) with other computing devices, such as a client, a server, or a sensitive data server. The processor 410 can be used to execute computer-executable instructions that are stored in the memory 430 and/or storage resources (not shown). The computer-executable instructions can be organized into software routines (also referred to as modules or components) comprising executable code to perform various computing tasks. It should be noted that while FIG. 4A illustrates one organization of routines, other organizations are possible. For example, the illustrated routines can be sub-divided into smaller routines and/or combined into larger routines. The memory 430 can also include structured and/or unstructured data that is used by the software routines to perform the computing tasks.

The operating system (OS) kernel 440 can include different software routines for managing different aspects of the execution of programs and for interfacing with the hardware of the intermediary server computer apparatus 110. For example, the OS kernel 440 can manage the loading and removal of software applications and other routines into the memory 430 of the computer apparatus 110; the OS kernel 440 can manage storage resources of the computer apparatus 110; the OS kernel 440 can manage processes and/or threads executing on the processor 410; the OS kernel 440 can manage power states of the computer apparatus 110; the OS kernel 440 can provide an interface for applications and other routines to send and receive communications (e.g., network packets) using the communications interface 420; and the OS kernel 440 can enable inter-process communication between different routines executing on the computer apparatus 110.

The gateway logic 112 can include different software routines for controlling the flow of network traffic between a client device, a server computer 140, and/or an application executing on the intermediary server computer 110. For example, the packet processing logic 360 can parse fields of a network packet to determine information such as the source of the packet, the destination of the packet, and the type of the packet. These fields can be used to determine how to further process the network packet, such as which routines will be used to process the packet. The gateway logic 112 can provide full or partial routing paths for network packets between sources and destinations of a client-server architecture and can allow or block network packets based on various security and/or routing policies.

The gateway logic 112 can include or communicate with various modules, such as firewall logic 432, attack detection logic 114, proxies, and/or other modules for applying the policies to control the network traffic. Specifically, the gateway logic 112 can add a layer of controls between the client devices and the server computers to potentially increase the security and/or performance of a client-server architecture. For example, the gateway logic 112 can intercept all client traffic destined for a server computer 140 and only allow the traffic to be forwarded after the traffic complies with all security policies. The intercepted network traffic can be stored in a network packet buffer 436 while the gateway logic 112 processes the respective network packets of the network traffic. The gateway logic 112 can identify network packets with sensitive data and can communicate with (such as by using the routines of the OS kernel 440) the sensitive data server 120 to determine whether the sensitive data is present in a sensitive data service database 122. The gateway logic 112 can cryptographically transform the sensitive data using the cryptographic function(s) 116. As illustrated in FIG. 4A, the cryptographic function(s) 116 are implemented in software. However, the cryptographic function(s) 116 can be implemented in hardware, software, and/or a combination of hardware and software. The gateway logic 112 can transmit a portion of the cryptographic transformation of the sensitive data to the sensitive data server. The gateway logic 112 can dynamically vary the size of the portion (e.g., the number of bits) that are transmitted from the intermediary server 110 to the sensitive data server. The gateway logic 112 can receive possible matches to the portion of the cryptographic transformation of the sensitive data from the sensitive data server. The gateway logic 112 can determine whether at least one of the possible matches are a match to the cryptographic transformation of the sensitive data of the request. When a match is detected, the gateway logic 112 can change an access policy for the requestor, the intermediary server computer 110, and/or the server computer.

The firewall logic 432 can include different software routines for implementing a security policy that specifies how network traffic passing through the intermediary server computer 110 is to be monitored and/or controlled. The firewall logic 432 can analyze fields within network packets from different layers of a network stack and make access control decisions based on the fields from the network packets. For example, the firewall logic 432 can analyze packet fields from network, transport, and application layers to make access control decisions based on the analyzed fields. The firewall logic 432 can control (e.g., allow or block) network traffic based on attack signatures 434 and the attack detection logic 114. A given attack signature includes rules and/or patterns that potentially identify a given type of attack against a web or other software application. For example, a credential-stuffing attack signature includes rules and/or patterns for detecting a credential-stuffing cyberattack. The pattern for a credential-stuffing attack can include a repeated number of requests using compromised account credentials within a threshold period of time. The number of requests and the amount of time can be variable based on a sensitivity and/or susceptibility of an application to the credential-stuffing attack. The number of requests and the amount of time can be specified in a security policy of the firewall logic 432. The firewall logic 432 can analyze network traffic and search for patterns that match the attack signatures 434. For example, the attack detection logic 114 can track a status of the analyzed traffic, such as the number of times that compromised account credentials are observed within the threshold period of time specified in the security policy. If a matching pattern is detected, the firewall logic 432 can implement the security policy. For example, the security policy can specify that when an attack is detected, one or more of the following actions can be performed: alarm a system administrator, redirect all network traffic or network traffic that is identified as potentially being part of an attack, restrict resources that are available to some or all of the network traffic, and/or block network traffic that matches a field, parameter, or filetype.

Figure 4B:
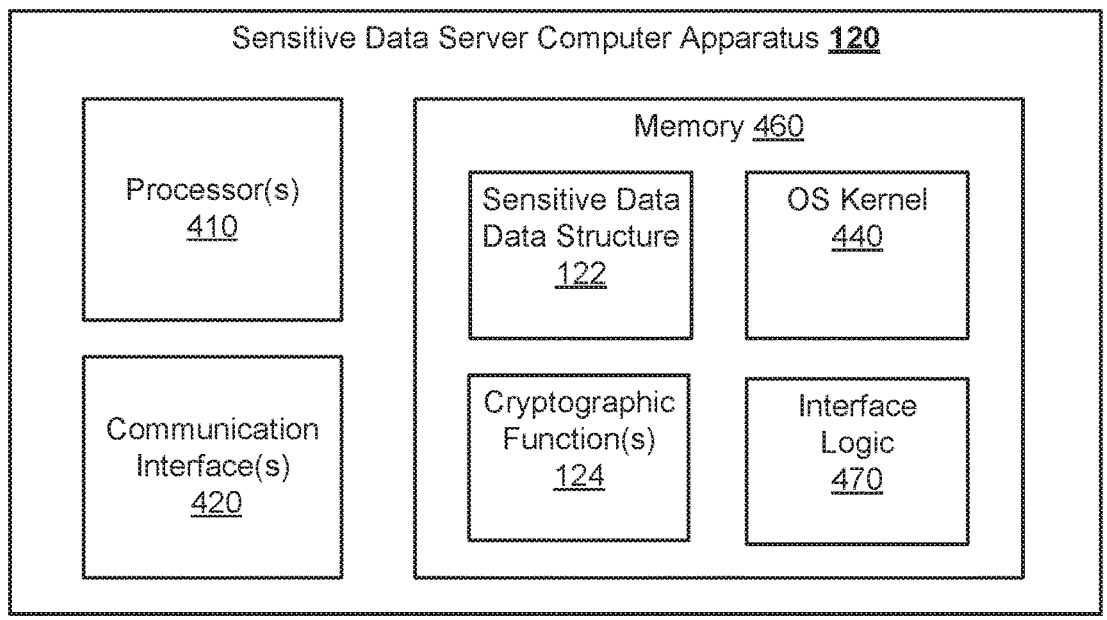
FIG. 4B is a block diagram of an example sensitive data server computer apparatus.

FIG. 4B is a block diagram of an example sensitive data server computer apparatus 120. The sensitive data server computer apparatus 120 can be implemented using a computing environment as described in more detail with reference to FIG. 8.

The sensitive data server computer apparatus 120 can include one or more processor(s) 410, one or more communication interface(s) 420, and memory 460. The processor 410, communication interface 420, and the memory 460 can be coupled together with an interconnect (not shown) so that the components of the sensitive data server computer apparatus 120 can communicate with each other using the interconnect. The communication interface 420 can be used to send and receive communications (e.g., network packets) with other computing devices, such as a client, a server or an intermediary server. The processor 410 can be used to execute computer-executable instructions that are stored in the memory 460 and/or storage resources (not shown). The computer-executable instructions can be organized into software routines (also referred to as modules or components) comprising executable code to perform various computing tasks. It should be noted that while FIG. 4B illustrates one organization of routines, other organizations are possible. For example, the illustrated routines can be sub-divided into smaller routines and/or combined into larger routines. The memory 460 can also include structured and/or unstructured data that is used by the software routines to perform the computing tasks.

The interface logic 432 can include different software routines for interfacing to a client or service provider. For example, the service provider can provide sensitive data that may have been compromised in a data breach or data leak. The provided sensitive data can be stored unencrypted or in a cryptographically transformed manner in the sensitive-data data structure 122. A client of the sensitive data server computer apparatus 120 can provide a portion of a cryptographic transformation of sensitive data to the sensitive data server 120. The interface logic 432 can return possible matches to the portion of the cryptographic transformation of the sensitive data to the client. The interface logic 432 can perform access control for the client requests, such as by confirming account credentials are from authorized users or validating that a digital signature of the request is from an authorized user.

The sensitive-data data structure 122 can store unencrypted and/or cryptographically transformed sensitive data. For example, unencrypted sensitive data can be cryptographically transformed using the cryptographic function(s) 124. As illustrated in FIG. 4B, the cryptographic function(s) 124 are implemented in software. However, the cryptographic function(s) 124 can be implemented in hardware, software, and/or a combination of hardware and software. The sensitive data or the cryptographically transformed sensitive data can be sorted or otherwise organized to increase a performance of a search for possible matches.

Example Methods for Managing Network Traffic with Sensitive Data

Figure 5:
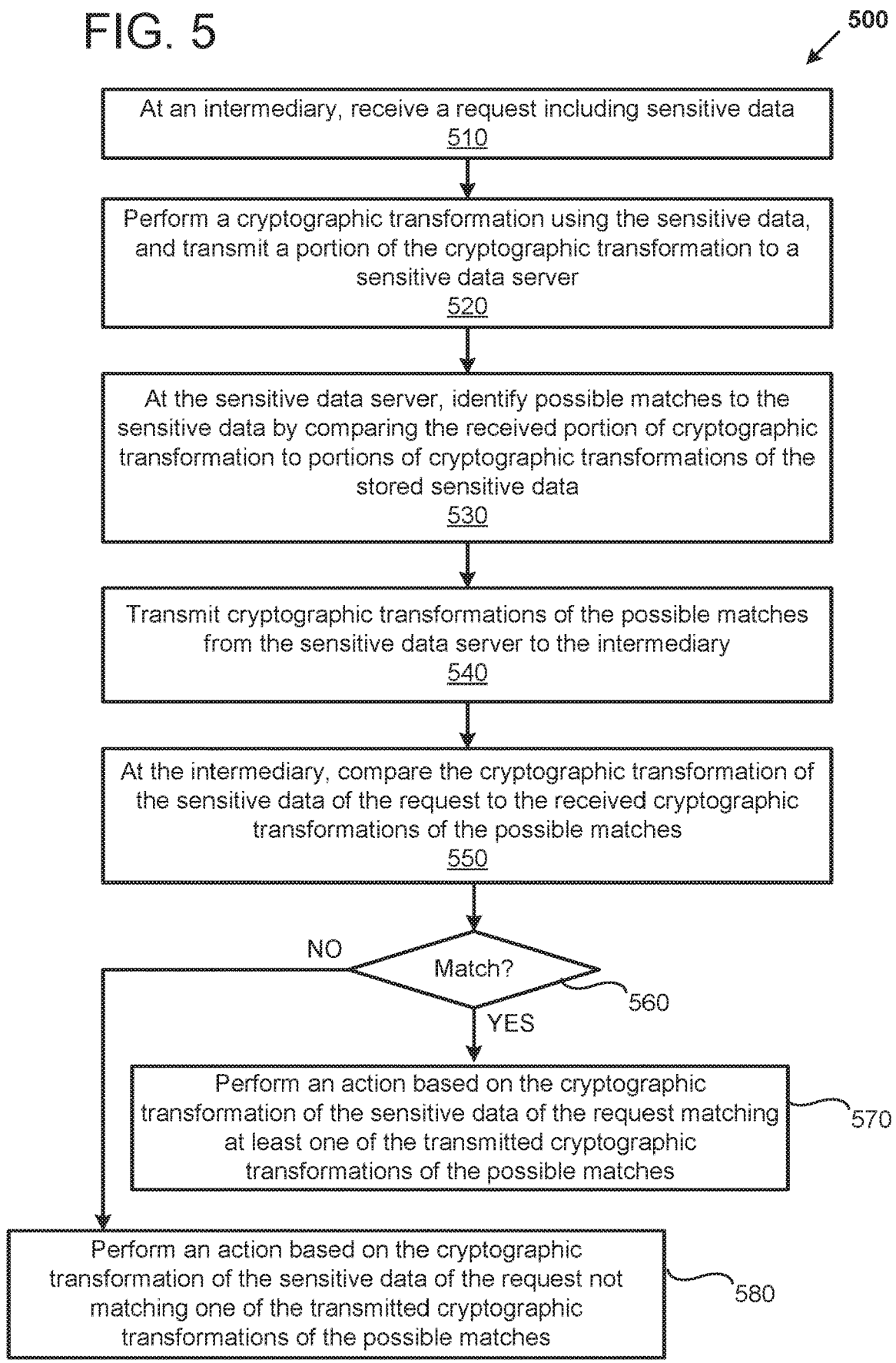
FIG. 5 is a flow diagram of an example method of managing network traffic with sensitive data.

FIG. 5 is a flow diagram of an example method 500 of managing network traffic with sensitive data. For example, the method 500 can be implemented using the intermediary server computer 110 and the sensitive data server 120, such as described above in reference to FIG. 1. For example, computer-executable instructions for carrying out the method 500 can be stored in computer-readable memories of the intermediary server computer 110 and the sensitive data server 120, and the instructions can be executed by processors of the intermediary server computer 110 and the sensitive data server 120 to perform the method 500.

At 510, a request including sensitive data can be received at an intermediary (e.g., intermediary server computer 110). The request can be a network packet including multiple fields that specify control information and data, such as addressing (e.g., a source and destination) information, an application or application protocol, and sensitive data. The sensitive data can include information that has value based on the information remaining generally confidential, such as full or partial account credentials (e.g., a username, a password, an email address, a username-password pair, or an email-address-password pair) or other information that is of a confidential nature (e.g., a credit card number, a date of birth, or a social security number). The request can be destined for a server computer and intercepted by the intermediary, or the request can be destined for the intermediary. The request can use different application-layer protocols, such as HTTP, HTTPS, FTP, or SSH.

At 520, a cryptographic transformation can be performed using the sensitive data, and a portion of the cryptographic transformation can be transmitted to a sensitive data server (e.g., the sensitive data server 120). Performing the cryptographic transformation of the sensitive data can include generating a hash value of the sensitive data, such as by using a one-way cryptographic hash function. Examples of cryptographic hash functions include SHA-1, SHA-2, MD4, and MD5. The output of the cryptographic transformation can be a fixed size, such as 128 or 256 bits. When more delay is acceptable, a more computationally complicated hash, such as Password-Based Key Derivation Function One (PBKDF1) or PBKDF2 or a Message Authentication Code ("MAC") such as HMAC-SHA256 can be used. The intermediary and the sensitive data server exchange a secret value when PBKDF or MAC functions are used. Using more computationally complicated functions can potentially reduce an impact of a dictionary attack against the sensitive data server. As a further safeguard for the confidentiality of the sensitive data, a portion of the cryptographic transformation is transmitted to the sensitive data server. For example, the portion of the sensitive data can be 4, 8, 16, or 24 bits. When more bits are transmitted, the confidentiality of the sensitive data may be more at risk, but fewer possible matches (530, 540) may be returned which can increase a speed of computing whether there is a match (560). Conversely, when fewer bits are transmitted, the confidentiality of the sensitive data may be more secure, but more possible matches may be returned which can decrease a speed of computing whether there is a match. The intermediary can select a number of bits to send based on a load of the intermediary. For example, the intermediary can send more bits (a larger portion) when the intermediary is more highly loaded and the intermediary can send fewer bits (a smaller portion) when the intermediary is less loaded. For large lists with random distributions of data, adding one bit to the portion may reduce the number of possible matches by one half on average.

At 530, possible matches to the sensitive data can be identified by comparing the received portion of cryptographic transformation to portions of cryptographic transformations of the stored sensitive data. The sensitive data server can include data that has been potentially compromised in a data breach or a data leak. Additionally, the sensitive data server can include other types of data, such as old account credentials that are not to be reused as part of a password reuse prevention system. The data stored on the sensitive data server can be stored unencrypted and/or in a cryptographically transformed state. Storing the data in the cryptographically transformed state can enable faster performance for the sensitive data server. Specifically, using the same cryptographic transformations for the stored sensitive data as for the sensitive data of the request can lead to faster performance. Additionally, sorting or otherwise organizing the stored data can potentially increase performance.

At 540, cryptographic transformations of the possible matches can be transmitted from the sensitive data server to the intermediary. The number possible matches can potentially impact a performance of the system. For example, sending more possible matches can reduce performance to account for the time to send the possible matches (more matches take more time to send). As one example, the sensitive data server can determine the number possible matches and if the number of possible matches are above a threshold number, the sensitive data server can inform the intermediary. The intermediary can then provide a larger portion of the cryptographic transformation of the sensitive data of the request so that the number of possible matches can be reduced. As another example, the sensitive data server can begin transmitting possible matches before the search for possible matches is complete. The cryptographic transformations of the possible matches can be sorted to potentially increase a performance of the comparisons (550) at the intermediary. As another example, additional cryptographic transformations can be transmitted to potentially conceal the amount of possible matches from an adversary that may be monitoring the transmission. As another example, the portion of the bits that are sent from the intermediary can be omitted in the cryptographic transformations of the possible matches transmitted from the sensitive data server. Omitting the bits reduce the amount of information that is transmitted between the sensitive data server and the intermediary and can deprive an adversary of that information if the adversary only observes the transmission from the sensitive data server to the intermediary.

At 550, at the intermediary, the cryptographic transformation of the sensitive data of the request can be compared to the received cryptographic transformations of the possible matches. At 560, it can be determined whether any of the received cryptographic transformations of the possible matches match the cryptographic transformation using the sensitive data of the request. If there is a match, the method 500 can continue at 570. If there is no match, the method 500 can continue at 580.

At 570, an action based on the cryptographic transformation of the sensitive data of the request matching at least one of the transmitted cryptographic transformations of the possible matches can be performed. For example, when the stored sensitive data at the sensitive data server includes compromised account credentials, a match can indicate that the compromised account credentials are being used for the request. The request can be from a legitimate user that is not aware that his or her credentials have been compromised (or has not yet changed his or her credentials) or the request can be from an adversary that is attempting a credential stuffing attack. A relatively small number of matches over a period of time are more likely to be legitimate users, whereas a relatively larger number of matches over the period of time are more likely to be from an adversary. The security policies to enforce during a match can be designed to protect the server computer and potentially reduce an impact on legitimate users. For example, different policies can be enforced before a threshold number of matches are detected within a predefined and/or dynamic time period. Before the threshold number is met, an alert can be sent to the user and/or an administrator, additional factor(s) can be requested as part of a multi-factor authentication process, the requestor can be sandboxed (e.g., provided with a reduced set of access privileges, such as preventing new accounts from being opened, preventing transfers of information and/or funds, or restricting the services and/or resources that are reachable). After the threshold number is met, an alert can be sent to an administrator, additional factor(s) can be requested as part of a multi-factor authentication process, or the requestor can be blocked. It should be noted that this description provides one set of tradeoffs when selecting the actions to perform before and after the threshold number is met, and different tradeoffs can be made between securing the server computer and reducing an impact on legitimate users.

At 580, an action based on the cryptographic transformation of the sensitive data of the request not matching one of the transmitted cryptographic transformations of the possible matches can be performed. For example, when the stored sensitive data at the sensitive data server includes compromised account credentials, a non-match can indicate that the account credentials being used for the request are not known to be compromised. The actions to perform can include performing additional gateway functions, requesting an additional factor as part of a multi-factor authentication process, or releasing the request from the intermediary to the server computer.

The method 500 can be used iteratively, such as described in the following example to ascertain whether a username, U, and corresponding password, P, known to a client of the sensitive data server (e.g., the intermediary) are also known to the sensitive data server. A non-iterative approach can include merging U and P into a single element of sensitive data, S, such as by concatenating them with a suitable separator, and then performing the method 500. An iterative approach can include: the intermediary may treat the username as a secret which the sensitive data server may or may not have on a list, and then if the sensitive data server does know that username, proceed to ascertain whether the secret password is on the sensitive data server's list of passwords for the specified username. To reduce communications with the sensitive data server, the intermediary may send a portion of a hash of U (PHU) and a portion of a hash of P (PHP) (which can be different lengths) to the sensitive data server together. Given both, the sensitive data server can identify the usernames which match PHU and for each of them, those passwords which match PHP. Then the sensitive data server can send a list of possible matches (e.g., tuples {Hu, Hp}) to the intermediary. The intermediary may compare {HP, HU} to the tuples in the list to ascertain whether the sensitive data server knows the {username, password} pair.

Figure 6:
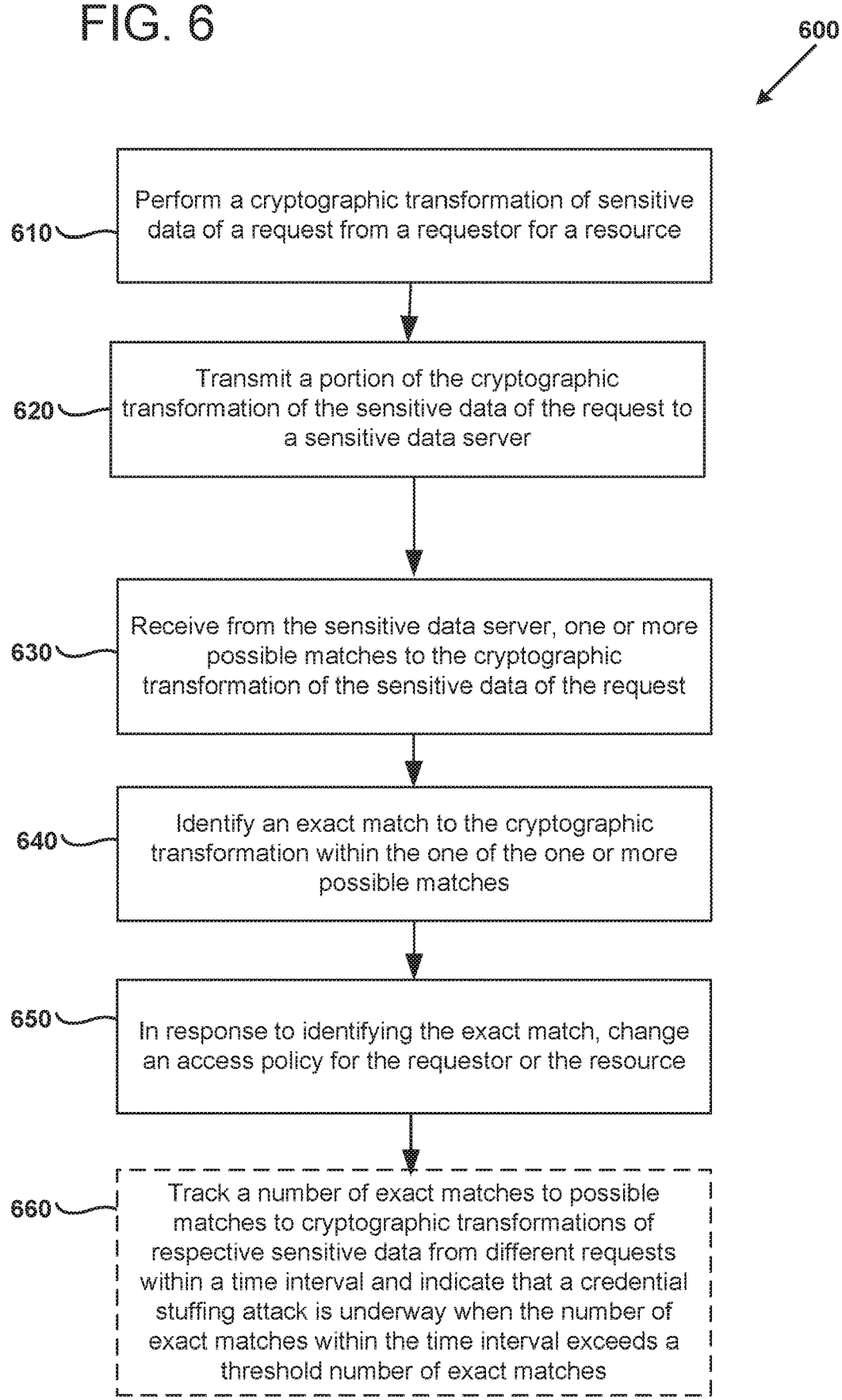
FIG. 6 is a flowchart of an example method of managing network traffic with sensitive data.

FIG. 6 is a flow diagram of an example method 600 of managing network traffic with sensitive data. For example, the method 600 can be implemented using a sensitive data server (e.g., the sensitive data server 120 of FIGS. 1-3 and 4B) and a client of the sensitive data server (e.g., the intermediary server computer 110, the client 130, or the server computer 120 of FIGS. 1-3 and 4A). For example, computer-executable instructions for carrying out the method 600 can be stored in a computer-readable memory of the client of the sensitive data server, and the instructions can be executed by a processor of the client of the sensitive data server to perform the method 600.

At 610, a cryptographic transformation of sensitive data of a request from a requestor for a resource can be performed. For example, the cryptographic transformation of the sensitive data can include generating a hash value of the sensitive data. The sensitive data can include a username-password pair.

At 620, a portion of the cryptographic transformation of the sensitive data of the request can be transmitted to a sensitive data server. A size of the transmitted portion of the cryptographic transformation of the sensitive data can be varied based on an amount of network traffic at the client of the sensitive data server.

At 630, one or more possible matches to the cryptographic transformation of the sensitive data of the request can be received from the sensitive data server. The one or more possible matches can have respective portions that match the transmitted portion of the cryptographic transformation of the sensitive data.

At 640, it can be determined whether an exact match to the cryptographic transformation of the sensitive data of the request is identified within the one or more possible matches.

At 650, in response to identifying the exact match, an access policy for the requestor or the resource can be changed. Changing the access policy for the requestor or the resource can include prompting the requestor for another authentication factor in a multi-factor authentication process. Changing the access policy for the requestor or the resource can include allowing the requestor to access the resource with a reduced set of access privileges.

At optional 660, a number of exact matches to possible matches to cryptographic transformations of respective sensitive data from different requests within a time interval can be tracked. When the number of exact matches within the time interval exceeds a threshold number of exact matches, it can be indicated that a credential stuffing attack is underway. In response to indicating that the credential stuffing attack is underway, changing the access policy for the requestor or the resource can include blocking future requests that have exact matches to possible matches to cryptographic transformations of respective sensitive data of the future requests.

ADDITIONAL EXAMPLES

The sensitive data server can be used in various ways to determine if a particular piece of sensitive data is stored on the sensitive data server. For example, different amounts of the cryptographically transformed sensitive data can be exchanged between the sensitive data server and a client of the sensitive data server. In the following example, the client can send the sensitive data server less information about the sensitive data, S, so that it can be unlikely that an adversary can learn S unless no shared-secret W is used and S matches some value in V. This method may require more processing than other described methods (such as methods 500 and 600) when L has many members.

The client can generate a cryptographic nonce, A. The client can derive from sensitive data S a key, KS, for a cipher (e.g., a symmetric cipher, though an asymmetric cipher may be used). For example, KS can be set to the first 128 bits of the SHA-256 hash of S. The client can use the cipher to encrypt A under the key KS to obtain ciphertext, Y. The client can send Y to the sensitive data server.

For each secret {a, b, c . . . } in list L the sensitive data server can generate a cryptographic nonce {Ba, Bb, Bc . . . } and from each secret can derive a key {Ka, Kb, Kc . . . } for the chosen cipher. The sensitive data server can use each Kx to encrypt the corresponding Bx to obtain ciphertexts {Za, Zb, Zc . . . }. The sensitive data server can attempt to decrypt Y to A using {Ka, Kb, Kc . . . }, obtaining putative plaintexts {Ca, Cb, Cc . . . }. The sensitive data server can derive from {Ba, Bb, Bc . . . } and {Ca, Cb, Cc . . . } a set of test keys {Qa, Qb, Qc . . . }. For example, each Qx may consist of Cx appended to Bx. The sensitive data server can uses a collision-resistant function such as a keyed MAC to derive test values {Fa, Fb, Fc . . . } from each test key Qx and a distinctive value E. For example, the sensitive data server might compute Fx=HMAC-SHA256 (Qx,E). The sensitive data server can send to the client a list V containing one tuple {Zx, Fx} for each {a, b, c . . . } in L.

When the client receives V, for each tuple {Zx, Fx} it can try to decrypt Zx to Bx using KS, obtaining putative plaintexts {Da, db, Dc . . . }. The client can derive from A and {Da, db, Dc . . . } a set of test keys {Ra, Rb, Rc . . . }. For example, each Rx may consist of A appended to Dx. For each Rx (and E) the client can use the collision-resistant function to derive a test value Gx. For example, Gx=HMAC-SHA256(Rx,E). When Gx and Fx are identical the client considers S to match the corresponding secret from L. Use of a collision-resistant function may be replaced by cipher operations. The sensitive data server can use a suitable cipher to encrypt a distinctive value E under each test key Qx, obtaining test values {Fa, Fb, Fc . . . }. The client can then attempt to decrypt each Fx using its test key Rx. If no attempt were to yield the plaintext E that would indicate that no secret in L matches S.

Some variations on this method can be useful in some cases. The sensitive data server can compute in advance and store values Bx and Zx for each secret in L to save time and/or repetitive work later. In this case Bx is not really a "nonce." To reduce the impact of or prevent a known-plaintext or dictionary attack on Y (for example, an adversary giving the client a known S) enabling dictionary attacks against values in V, client and sensitive data server may share a secret value W and use it as an additional input to the calculation of certain values used in the method. The derivation of KS and each Kx may depend upon W. For example, KS might be the first 128 bits of HMAC-SHA256 (W,S). The derivation of each Qx and Rx may depend upon W. For example, Rx=HMAC-SHA256(W,Dx+A). The server may add extra arbitrary tuples to V to conceal the number of server secrets which match PHS. This method may be combined with other methods described herein to select a portion of L on the basis of information other than S.

Example Computing Environments

Figure 7:
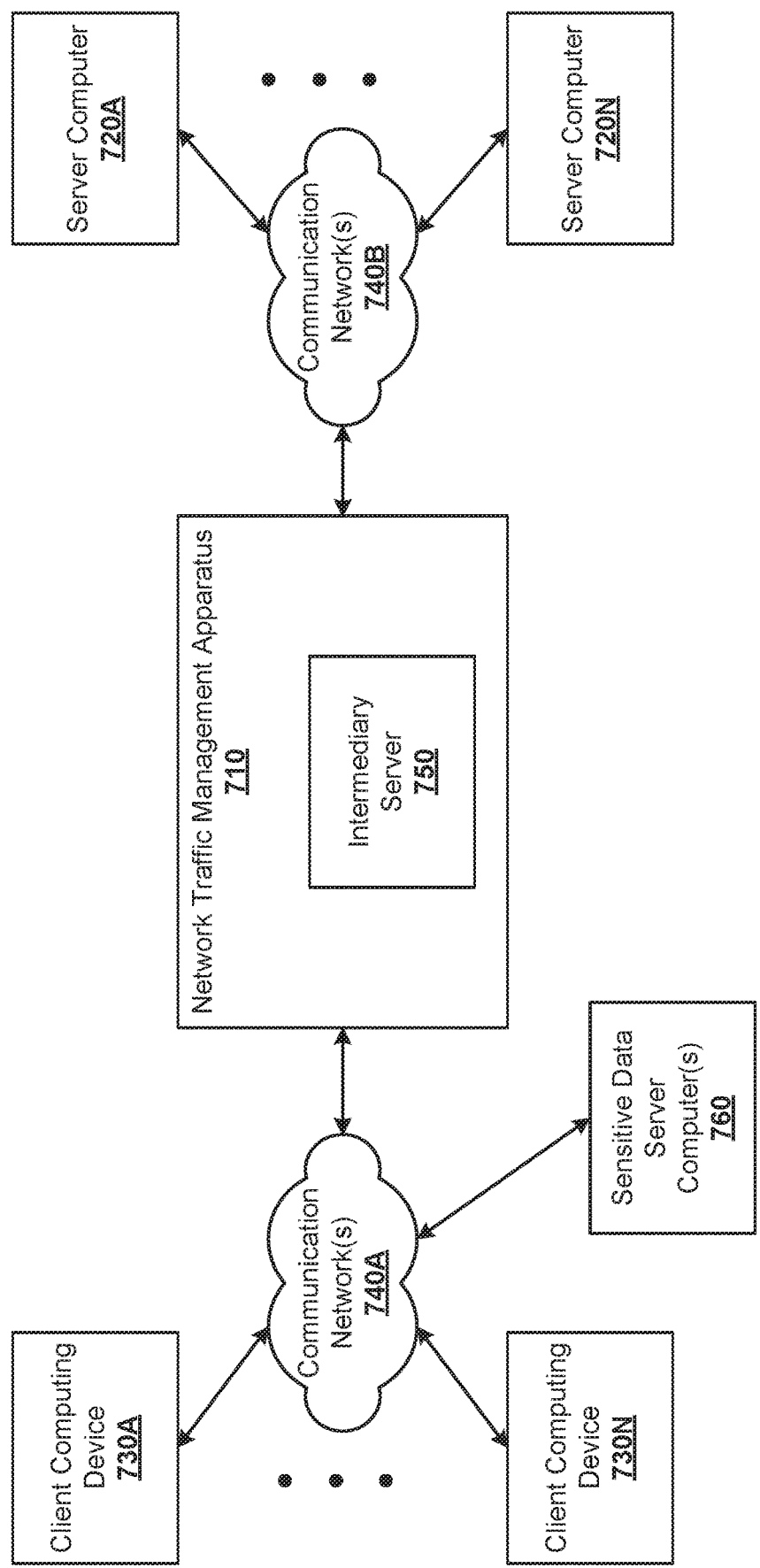
FIG. 7 is a block diagram of an example client-server architecture including a network traffic management apparatus executing an intermediary server.

FIG. 7 illustrates an example client-server architecture 700 that incorporates a network traffic management apparatus 710 including an intermediary server 750. The client-server architecture 700 includes a network traffic management apparatus 710 that is coupled to one or more server computers (such as server computers 720A-N), and one or more client devices (such as client computing devices 730A-N) via one or more communication networks (such as the communication networks 740A and 740B). The server computers 720A-N can communicate with one or more additional server computer(s), such as the sensitive data server computer 760, that are accessible via the communication networks 740A. As one example, the communication network 740A can include a public network (e.g., the Internet) and devices attached to the network 740A can be accessed using public network addresses; the communication network 740B can include a private network and devices attached to the network 740B can be accessed using private network addresses.

The communication networks 740A-B can include various wired and/or wireless communication technologies, such as a local area network (LAN), a wide area network (WAN), an intranet, the Internet, a public switched telephone network (PSTN), and so forth. The devices connected to the communication networks 740A-B can communicate with each other using various communications protocols, such as transmission control protocol with Internet protocol (TCP/IP) over Ethernet and/or other customized or industry-standard protocols. The communication protocols can be used to transmit information over the networks 740A-B using packet-based messages (e.g., Ethernet-based packet data networks) and/or other application programming interfaces (APIs). An API is a programmatic interface (e.g., a set of methods and/or protocols) for communicating among different modules. The communication networks 740A-B can include various network devices, such as switches (multilayer or single-layer), routers, repeaters, gateways, network bridges, hubs, protocol converters, bridge routers, proxy servers, firewalls, network address translators, multiplexers, network interface controllers, wireless network interface controllers, modems, line drivers, and wireless access points, for example. As illustrated, the network traffic management apparatus 710 is positioned in-line between the client computing devices 730A-N and the server computers 720A-N so that the network traffic management apparatus 710 can intercept all network traffic flowing between the different networks 740A and 740B. In other examples, the network traffic management apparatus 710, the server computer 720A-N, and the client devices 730A-N can be coupled together via other topologies. As one specific example, the server computers 720A-N can be integrated within the network traffic management system 700 (e.g., server computer functions can be implemented in software within one or more devices of the network traffic management apparatus 710). It should be appreciated by one of ordinary skill in the art having the benefit of the present disclosure, that the network topology illustrated in FIG. 7 has been simplified and that multiple networks and networking devices can be utilized to interconnect the various computing systems disclosed herein. Additionally, one or more of the devices of the client-server architecture 700 in these examples can be in a same or a different communication network including one or more public, private, or cloud networks, for example.

Figure 8:
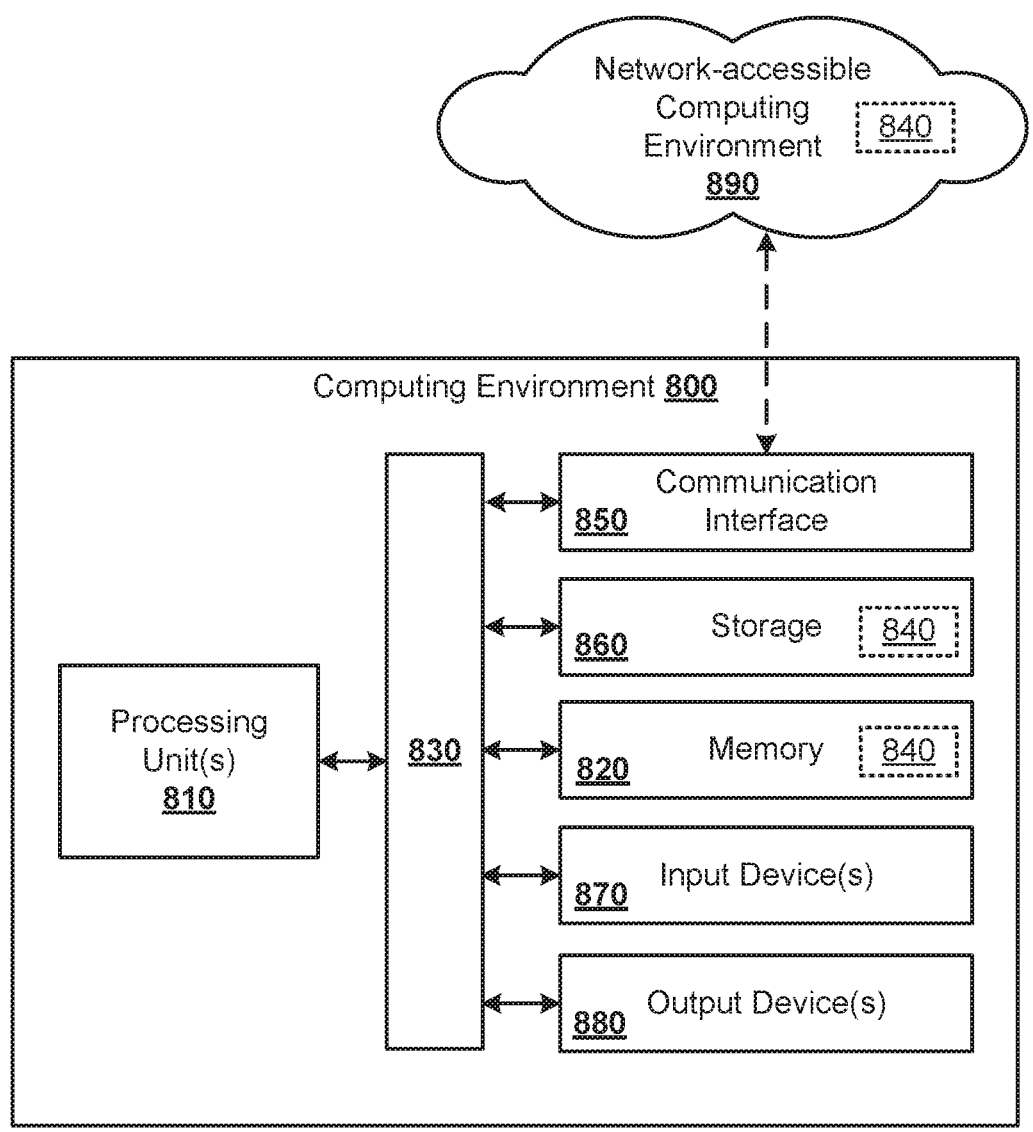
FIG. 8 is a block diagram of an example computing environment, such as can be used for an intermediary server computer.

Generally, the server computers 720A-N, the server computer(s) 760, the client devices 730A-N, and the network traffic management system 700 can perform various computing tasks that are implemented using a computing environment, such as the computing environment described in more detail with respect to FIG. 8. The computing environment can include computer hardware, computer software, and combinations thereof. As a specific example, the computing environment can include general-purpose and/or special-purpose processor(s), configurable and/or hard-wired electronic circuitry, a communications interface, and computer-readable memory for storing computer-executable instructions to enable the processor(s) to perform a given computing task. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations.

The client devices 730A-N can include any type of computing device that can exchange network data, such as mobile communication devices, laptop computers, desktop computers, tablet computers, virtual machines executing within a cloud-computer-based environment, and so forth. The client devices 730A-N can run interface applications, such as web browsers or standalone client applications, which may provide an interface to communicate with (e.g., make requests for, and receive content stored on) one or more of the server computers 720A-N via the communication network(s) 740A and 740B. The client devices 730A-N can further include an output device (such as a display screen or touchscreen (not illustrated)) and/or an input device (such as a keyboard (not illustrated)). Additionally, one or more of the client devices 730A-N can be configured to execute software code (e.g., JavaScript code within a web browser) in order to log client-side data and provide the logged data to the network traffic management apparatus 710 or the server computers 720A-N.

The server computers 720A-N and 760 can include any type of computing device that can exchange network data. For example, the server computers 720A-N can exchange network data with the client devices 730A-N, with each other, and/or with the server computer(s) 760. As another example, the server computers 720A-N can exchange communications along communication paths specified by application logic in order to facilitate a client-server application interacting with the client devices 730A-N. Examples of the server computers 720A-N can include application servers, database servers, access control servers, and encryption servers. Accordingly, in some examples, one or more of the server computers 720A-N process login and other requests received from the client devices 730A-N via the communication network(s) 740A and 740B according to the Hypertext Transfer Protocol (HTTP) or Hypertext Transfer Protocol Secure (HTTPS) application-layer protocol. A web application may be operating on one or more of the server computers 720A-N and transmitting data (e.g., files or web pages) to the client devices 730A-N (e.g., via the network traffic management apparatus 710) in response to requests from the client devices 730A-N. The server computers 720A-N can be hardware and/or software and may represent a system with multiple servers in a pool, which may include internal or external networks.

While the server computers 720A-N are illustrated as single devices, one or more actions of each of the server computers 720A-N may be distributed across one or more distinct network computing devices that together comprise one or more of the server computers 720A-N. Moreover, the server computers 720A-N are not limited to a particular configuration. Thus, the server computers 720A-N may contain network computing devices that operate using a coordinated approach, whereby one of the network computing devices of the server computers 720A-N operate to manage or otherwise coordinate operations of the other network computing devices. Each of the server computers 720A-N can operate as a networked computing device within a cluster architecture, a computing device within a peer-to peer architecture, a virtual machine, or a resource within a cloud-based computer architecture, for example. Thus, the technology disclosed herein is not to be construed as being limited to a single environment and other configurations and architectures are also envisaged. For example, one or more of the server computers 720A-N can operate within the network traffic management apparatus 710 itself rather than as a stand-alone server device communicating with the network traffic management apparatus 710 via communication network 740B. In this example, the one or more of the server computers 720A-N operate within the memory of the network traffic management apparatus 710.

The network traffic management apparatus 710 can include any type of computing device that can be used for managing network traffic. The network traffic management apparatus 710 can perform a number of functions, including providing network security, access control, load balancing network traffic across the server computers 720A-N, and/or accelerating network traffic associated with an application hosted by one or more of the server computers 720A-N, for example. The network traffic management apparatus 710 includes an intermediary server module 750 that can be used to perform access control in conjunction with the sensitive data server 760. Additionally, the network traffic management apparatus 710 can include other network devices such as one or more routers or switches, for example In one example, the network traffic management apparatus 710 can be a dedicated computing device including a processor (not illustrated) and a computer-readable memory (not illustrated). The memory of the network traffic management apparatus 710 can store one or more applications that can include computer-executable instructions that, when executed by the network traffic management apparatus 710, cause the network traffic management apparatus 710 to perform actions, such as to transmit, receive, or otherwise process messages, for example, and to perform other actions described and illustrated above with reference to FIGS. 1-6. Specifically, the memory can include computer-executable instructions for performing the functions of managing network traffic with sensitive data. The application(s) can be implemented as components of other applications. Further, the application(s) can be implemented as operating system extensions, plugins, or the like.

While the network traffic management apparatus 710 is illustrated in this example as including a single device, the network traffic management apparatus 710 in other examples can include a plurality of devices or blades each having one or more processors (each processor with one or more processing cores) that implement one or more components of this technology. In these examples, one or more of the devices can have a dedicated communication interface or memory. Alternatively, one or more of the devices can utilize the memory, communication interface, or other hardware or software components of one or more other devices included in the network traffic management apparatus 710. Additionally, the network traffic management apparatus 710 and/or the application(s) executed by the network traffic management apparatus 710 can be operative in a cloud-based computing environment. The application(s) can be executed within or as virtual machine(s) or virtual server(s) that can be managed in a cloud-based computing environment. For example, the application(s), and even the network traffic management apparatus 710 itself, can be located in virtual server(s) running in a cloud-based computing environment rather than being tied to one or more specific physical network computing devices. Also, the application(s) can be running in one or more virtual machines (VMs) executing on the network traffic management apparatus 710. Additionally, in one or more examples of this technology, virtual machine(s) running on the network traffic management apparatus 710 can be managed or supervised by a hypervisor. Additionally, one or more of the components that together comprise the network traffic management apparatus 710 can be standalone devices or integrated with one or more other devices or apparatuses, such as with one or more of the server computers 720A-N, for example.

Additionally, one or more of the components depicted in the client-server architecture 700, such as the network traffic management apparatus 710, server computers 720A-N and 760, or client computing devices 730A-N, for example, may be configured to operate as virtual instances on the same physical machine. In other words, one or more of the network traffic management apparatus 710, server computers 720A-N and 760, or client computing devices 730A-N may operate on the same physical device rather than as separate devices communicating through communication networks 740A and 740B. Additionally, there may be more or fewer network traffic management apparatuses, client computing devices, or server computers than illustrated in FIG. 7.

FIG. 8 illustrates a block diagram of a generalized example of a suitable computing environment 800 that can be used to implement the examples, techniques, and technologies described herein. For example, the computing environment 800 can be used to implement a network traffic management apparatus including an intermediary server that performs the disclosed techniques for managing network traffic with sensitive data using an intermediary server and an sensitive data server.

The computing environment 800 includes at least one processing unit 810 and computer-readable memory 820, which are coupled together by an interconnect 830. The processing unit 810 executes computer-executable instructions. The processing unit 810 can include a general-purpose processor, a special-purpose processor, and combinations thereof. For example, the processing unit 810 can include a general-purpose central processing unit (CPU), a graphics processor, a processor in an application-specific integrated circuit (ASIC), a processor configured to operate using programmable logic (such as in a field-programmable gate array (FPGA)), and/or any other type of processor. In a multi-processing system, multiple processing units can be used to execute computer-executable instructions to increase processing power.

The memory 820 stores software 840 implementing one or more innovations described herein, in the form of computer-executable instructions suitable for execution by the processing unit 810. Specifically, the memory 820 can be used to store computer-executable instructions, data structures, input data, output data, and other information. The memory 820 can include volatile memory (e.g., registers, cache, random-access memory (RAM)), non-volatile memory (e.g., read-only memory (ROM), electrically-erasable programmable ROM (EEPROM), and flash memory), and/or combinations thereof. The memory 820 can include operating system software (not illustrated). Operating system software can provide an operating environment for other software executing in the computing environment 800 and can coordinate activities of the components of the computing environment 800.

The interconnect 830 is used to connect different components of the computing environment 800 together so that the processing unit 810 can communicate with the different components and/or so that the different components can communicate with each other. For example, the interconnect 830 can include a bus, controller, and/or a network. As one example, the interconnect 830 can include a host bridge (also referred to as a northbridge) for connecting the processing unit 810 to relatively high-speed components (such as the memory 820) and an input/output bridge (also referred to as a southbridge) for connecting to relatively lower-speed components (such as a communications interface 850) within the computing environment 800. In some examples, one or more components of the computing environment 800 can be integrated within or connected directly to the processing unit 810.

The computing environment 800 can include a communication interface 850 for communicating with another computing entity using a communication medium (e.g., a physical layer). The communication interface 850 can implement all or a portion of a network protocol stack. The network protocol stack defines communication formats and rules for communicating between different devices connected to a network. For example, the network protocol stack can define modular layers for communication using the Open Systems Interconnection (OSI) model or another model. The OSI model standardizes and partitions a communication system into seven layers including a physical layer (referred to as layer 1) and an application layer (referred to as layer 7). The application layer can be used to define how applications access the communications subsystem. The physical layer defines the electrical and physical specifications for communication over a communication medium (also referred to as a physical transmission medium). The communication medium can be used to convey information, such as computer-executable instructions or other data, in a modulated data signal. A modulated data signal is a signal that has one or more of its characteristics adjusted in such a manner as to encode information in the signal. The communication interface 850 can include electronic and/or optical circuitry to receive and transmit communications signals that are encoded (e.g., according to a physical layer specification of the network stack) using an electrical, optical, radio-frequency (RF), or another carrier signal. Accordingly, the communication interface 850 can be used to communicate over wired connections (e.g., twisted-wire pair, coaxial cable, and fiber optic connections) and/or wireless technologies (e.g., Bluetooth, WiFi (IEEE 802.11), and cellular). As a specific example with reference to FIG. 7, a communication interface of the network traffic management apparatus 710 operatively couples to and communicates with the communication networks 740A and 740B so that the network traffic management apparatus 710 is coupled to and can communicate with the server computers 720A-N and 760 and the client computing devices 730A-N.

The computing environment 800 can include storage 860 that is used to store instructions for the software 840, data structures, and data, which can be used to implement the technologies described herein. The storage 860 can include electronic circuitry for reading and/or writing to removable or non-removable storage media using magnetic, optical, or other reading and writing system that is coupled to the processor. The storage 860 can include read-only storage media and/or readable and writeable storage media, such as magnetic disks, solid state drives, magnetic tapes or cassettes, CD-ROMs, CD-RWs, DVDs, or any other medium which can be used to store information and that can be accessed within the computing environment 800.

The computing environment 800 can include input device(s) 870. For example, the input device(s) 870 can provide an input interface to a user of the computing environment 800 and/or to receive inputs from a physical environment. The input device(s) 870 can include a tactile input device (e.g., a keyboard, a mouse, or a touchscreen), a microphone, a camera, a sensor, or another device that provides input to the computing environment 800.

The computing environment 800 can include output device(s) 880. For example, the output device(s) 880 can provide an output interface to a user of the computing environment 800 and/or to generate an output observable in a physical environment. The output device(s) 880 can include a light-emitting diode, a display, a printer, a speaker, a CD-writer, or another device that provides output from the computing environment 800. In some examples, the input device(s) 870 and the output device(s) 880 can be used together to provide a user interface to a user of the computing environment 800.

The computing environment 800 is not intended to suggest limitations as to scope of use or functionality of the technology, as the technology can be implemented in diverse general-purpose and/or special-purpose computing environments. For example, the disclosed technology can be practiced in a local, distributed, and/or network-enabled computing environment. In distributed computing environments, tasks are performed by multiple processing devices. Accordingly, principles and advantages of distributed processing, such as redundancy, parallelization, and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof. As a specific example, a distributed computing environment can include the processing unit 810 and the network-accessible computing environment 890 that is linked through a communications network. In a distributed computing environment, program modules 840 (including executable instructions for managing network traffic having sensitive data) can be located in both local and remote memory storage devices.

The term computer-readable media includes non-transient media for data storage, such as memory 820 and storage 860, and does not include transmission media such as modulated data signals and carrier waves. Any of the disclosed methods can be implemented as computer-executable instructions stored on one or more computer-readable media and executed on a computer (e.g., any commercially available computer). Any of the computer-executable instructions for implementing the disclosed techniques as well as any data structures and data created and used during implementation of the disclosed embodiments can be stored on one or more computer-readable storage media. For example, the computer-executable instructions can be part of a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, or other such network) using one or more network-attached computers.

This disclosure is set forth in the context of representative examples that are not intended to be limiting. Accordingly, this disclosure is directed toward all novel and non-obvious features and aspects of the various disclosed examples, alone and in various combinations and sub-combinations with one another. Many variations of the specific hardware and software used to implement the examples are possible, as will be appreciated by those skilled in the relevant art with the benefit of this disclosure. The disclosed systems, methods, and apparatus are not limited to any specific aspect or feature or combinations thereof, nor does the disclosed technology require that any one or more specific advantages be present or problems be solved. Theories of operation, scientific principles, or other theoretical descriptions presented herein in reference to the disclosed technology have been provided for the purposes of better understanding and are not intended to be limiting in scope. The apparatus and methods in the appended claims are not limited to those apparatus and methods that function in the manner described by such theories of operation.

As used in this application the singular forms "a," "an," and "the" include the plural forms unless the context clearly dictates otherwise. The term "coupled" encompasses mechanical, electrical, magnetic, optical, as well as other practical ways of coupling or linking items together, and does not exclude the presence of intermediate elements between the coupled items. The term "and/or" means any one item or combination of items in the phrase.

The recited order of processing elements or sequences, or the use of numbers, letters, or other designations therefore, is not intended to limit the claimed processes to any order. Although the operations of some of the disclosed methods are described in a particular, sequential order for convenient presentation, it should be understood that this manner of description encompasses rearrangement, unless a particular ordering is required by specific claim language set forth below. For example, operations described sequentially may in some cases be rearranged or performed concurrently. Moreover, for the sake of simplicity, the attached figures may not show all of the various ways in which the disclosed methods can be used in conjunction with other methods.

It should also be well understood that any software functionality described herein can be performed, at least in part, by one or more hardware logic components, instead of software. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Having thus described many possible embodiments to which the principles of the invention may be applied, it will be recognized by those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the scope of the claimed subject matter is defined by the following claims. We therefore claim as our invention all that comes within the scope of these claims.

The invention claimed is:

1. A method for managing network traffic with sensitive data implemented in cooperation with a network traffic management system comprising one or more network traffic management modules, sensitive data server modules, server modules or client modules, the method comprising:
performing a cryptographic transformation of sensitive data of a request from a requestor for a resource;
transmitting a portion of the cryptographic transformation of the sensitive data of the request to a sensitive data server, wherein a size of the transmitted portion of the cryptographic transformation of the sensitive data is based on an amount of network traffic and the transmitted portion of the cryptographic transformation of the sensitive data comprises a number of bits of a hash of the sensitive data that is less than a total number of bits of the hash of the sensitive data;
receiving from the sensitive data server, one or more possible matches to the cryptographic transformation of the sensitive data of the request, the one or more possible matches having respective portions that match the transmitted portion of the cryptographic transformation of the sensitive data;
identifying an exact match to the cryptographic transformation within the one or more possible matches; and
in response to identifying the exact match, changing an access policy for the requestor or the resource.

2. The method of claim 1, further comprising:
tracking a number of exact matches to possible matches to cryptographic transformations of respective sensitive data from different requests within a time interval and indicating that a credential stuffing attack is underway when the number of exact matches within the time interval exceeds a threshold number of exact matches.

3. The method of claim 1, wherein changing the access policy for the requestor or the resource comprises, identifying that a credential stuffing attack is underway and blocking future requests that have exact matches to possible matches to cryptographic transformations of respective sensitive data of the future requests.

4. The method of claim 1, wherein changing the access policy for the requestor or the resource comprises allowing the requestor to access the resource with a reduced set of access privileges.

5. The method of claim 1, wherein changing the access policy for the requestor or the resource comprises prompting the requestor for another authentication factor in a multi-factor authentication process.

6. The method of claim 1, wherein performing the cryptographic transformation of the sensitive data comprises generating the hash of the sensitive data.

7. The method of claim 1, wherein the sensitive data comprises a username-password pair.

8. A network traffic system comprising one or more network traffic management modules, server modules, or sensitive data server modules, memory comprising programmed instructions stored thereon, and one or more processors configured to be capable of executing the stored programmed instructions to:

perform a cryptographic transformation of sensitive data of a request from a requestor for a resource;

transmit a portion of the cryptographic transformation of the sensitive data of the request to a sensitive data server, wherein a size of the transmitted portion of the cryptographic transformation of the sensitive data is based on an amount of network traffic and the transmitted portion of the cryptographic transformation of the sensitive data comprises a number of bits of a hash of the sensitive data that is less than a total number of bits of the hash of the sensitive data;

receive from the sensitive data server, one or more possible matches to the cryptographic transformation of the sensitive data of the request, the one or more possible matches having respective portions that match the transmitted portion of the cryptographic transformation of the sensitive data;

identify an exact match to the cryptographic transformation within the one of the one or more possible matches; and in response to identifying the exact match, change an access policy for the requestor or the resource.

9. The network traffic system of claim 8, wherein the processors are further configured to be capable of executing the stored programmed instructions to:

track a number of exact matches to possible matches to cryptographic transformations of respective sensitive data from different requests within a time interval and indicating that a credential stuffing attack is underway when the number of exact matches within the time interval exceeds a threshold number of exact matches.

10. The network traffic system of claim 8, wherein changing the access policy for the requestor or the resource comprises prompting the requestor for another authentication factor in a multi-factor authentication process.

11. A non-transitory computer readable medium having stored thereon instructions for managing network traffic comprising executable code that, when executed by one or more processors, causes the processors to:

perform a cryptographic transformation of sensitive data of a request from a requestor for a resource;

transmit a portion of the cryptographic transformation of the sensitive data of the request to a sensitive data server, wherein a size of the transmitted portion of the cryptographic transformation of the sensitive data is based on an amount of network traffic and the transmitted portion of the cryptographic transformation of the sensitive data comprises a number of bits of a hash of the sensitive data that is less than a total number of bits of the hash of the sensitive data;

receive from the sensitive data server, one or more possible matches to the cryptographic transformation of the sensitive data of the request, the one or more possible matches having respective portions that match the transmitted portion of the cryptographic transformation of the sensitive data;

identify an exact match to the cryptographic transformation within the one of the one or more possible matches are an exact match to the cryptographic transformation of the sensitive data of the request; and in response to identifying the exact match, change an access policy for the requestor or the resource.

12. The non-transitory computer readable medium of claim 11, wherein changing the access policy for the requestor or the resource comprises allowing the requestor to access the resource with a reduced set of access privileges.

13. The non-transitory computer readable medium of claim 11, further comprising instructions that, when executed by the one or more processors, causes the processors to:

track a number of exact matches to possible matches to cryptographic transformations of respective sensitive data from different requests within a time interval and indicating that a credential stuffing attack is underway when the number of exact matches within the time interval exceeds a threshold number of exact matches.

14. A network traffic management apparatus, comprising memory comprising programmed instructions stored thereon and one or more processors configured to be capable of executing the stored programmed instructions to:

perform a cryptographic transformation of sensitive data of a request from a requestor for a resource;

transmit a portion of the cryptographic transformation of the sensitive data of the request to a sensitive data server, wherein a size of the transmitted portion of the cryptographic transformation of the sensitive data is based on an amount of network traffic and the transmitted portion of the cryptographic transformation of the sensitive data comprises a number of bits of a hash of the sensitive data that is less than a total number of bits of the hash of the sensitive data;

receive from the sensitive data server, one or more possible matches to the cryptographic transformation of the sensitive data of the request, the one or more possible matches having respective portions that match the transmitted portion of the cryptographic transformation of the sensitive data;

identify an exact match to the cryptographic transformation within the one or more possible matches; and in response to identifying the exact match, change an access policy for the requestor or the resource.

15. The network traffic management apparatus of claim 14, wherein changing the access policy for the requestor or the resource comprises prompting the requestor for another authentication factor in a multi-factor authentication process.

16. The network traffic management apparatus of claim 14, wherein the processors are further configured to be capable of executing the stored programmed instructions to:

track a number of exact matches to possible matches to cryptographic transformations of respective sensitive data from different requests within a time interval and indicating that a credential stuffing attack is underway when the number of exact matches within the time interval exceeds a threshold number of exact matches.

* * * * *